(12) United States Patent
Miedema et al.

(10) Patent No.: US 10,992,374 B1
(45) Date of Patent: Apr. 27, 2021

(54) AUTOMATIC REMOTE NODE TURN-UP PROCEDURE USING A RAMAN AMPLIFIER ON A STRETCHED FIBER SPAN

(71) Applicant: Ciena Corporation, Hanover, MD (US)

(72) Inventors: David Miedema, Ottawa (CA); Choudhury A. Al Sayeed, Stittsville (CA); Song Cao, Kanata (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/882,490

(22) Filed: May 24, 2020

(51) Int. Cl.
*H04B 10/077* (2013.01)
*H04B 10/071* (2013.01)

(52) U.S. Cl.
CPC ....... *H04B 10/0771* (2013.01); *H04B 10/071* (2013.01); *H04B 10/0775* (2013.01); *H04B 10/0777* (2013.01)

(58) Field of Classification Search
CPC .............. H04B 10/0771; H04B 10/071; H04B 10/0775; H04B 10/0777
USPC .......................................................... 398/13
See application file for complete search history.

(56) References Cited

U.S. PATENT DOCUMENTS

| | | | |
|---|---|---|---|
| 5,532,864 | A | 7/1996 | Alexander et al. |
| 6,222,668 | B1 | 4/2001 | Dutrisac et al. |
| 6,765,659 | B1 | 7/2004 | Bhatnagar et al. |
| 7,116,471 | B2 | 10/2006 | Ghera et al. |
| 7,385,754 | B2 | 6/2008 | Ghera et al. |
| 7,388,657 | B2 | 6/2008 | Abbott |
| 7,440,177 | B2 | 10/2008 | Ghera et al. |
| 7,773,884 | B2 | 8/2010 | Ghera et al. |
| 7,872,738 | B2 | 1/2011 | Abbott |
| 7,983,298 | B2 | 7/2011 | Nanda et al. |
| 9,419,708 | B2 | 8/2016 | Rad et al. |
| 9,485,013 | B2 | 11/2016 | Al Sayeed et al. |
| 9,793,986 | B2 | 10/2017 | Archambault et al. |
| 9,847,831 | B2 | 12/2017 | Archambault et al. |
| 10,237,633 | B2 | 3/2019 | Chedore et al. |
| 10,250,324 | B1 | 4/2019 | Chedore et al. |
| 10,263,386 | B1 | 4/2019 | Sridhar et al. |
| 10,411,796 | B1 | 9/2019 | Archambault et al. |
| 10,547,404 | B1 * | 1/2020 | Al Sayeed ......... H04B 10/0777 |
| 2001/0024542 | A1 * | 9/2001 | Aina .................. G02B 6/29319 385/24 |
| 2004/0136727 | A1 | 7/2004 | Androni et al. |
| 2004/0150875 | A1 | 8/2004 | Fishman et al. |
| 2005/0200945 | A1 | 9/2005 | Fella et al. |
| 2006/0024063 | A1 | 2/2006 | Onaka et al. |
| 2006/0140115 | A1 | 6/2006 | Timus et al. |
| 2007/0025676 | A1 | 2/2007 | Russell |
| 2008/0050121 | A1 | 2/2008 | Evangelides et al. |
| 2009/0052322 | A1 | 2/2009 | Simonsson et al. |

(Continued)

Primary Examiner — Dalzid E Singh
(74) Attorney, Agent, or Firm — Clements Bernard Walker; Lawrence A. Baratta, Jr.; Christopher L. Bernard

(57) ABSTRACT

Systems and methods for remotely turning on and turning up a Raman amplifier are provided. In one embodiment, a method includes the step of turning on one or more Raman pumps of a Raman amplifier to a predetermined safe gain or power level. The method also includes determining an estimated loss along a fiber optic span of a link between adjacent nodes of an optical network. Responsive to the estimated loss being greater than a reach of an Optical Supervisory Channel (OSC) signal along the link, the method includes the step of adjusting the gain or power level of the one or more Raman pumps.

20 Claims, 11 Drawing Sheets

(56) References Cited

U.S. PATENT DOCUMENTS

| | | |
|---|---|---|
| 2009/0207482 A1 | 8/2009 | Izumi |
| 2009/0285116 A1 | 11/2009 | Nanda et al. |
| 2011/0141552 A1 | 6/2011 | Shera et al. |
| 2012/0033293 A1 | 2/2012 | Zaacks et al. |
| 2014/0022626 A1 | 1/2014 | Eliyahu et al. |
| 2014/0055777 A1 | 2/2014 | Archambault et al. |
| 2014/0072306 A1* | 3/2014 | Sridhar ............... H04J 14/0275 398/79 |
| 2014/0104679 A1* | 4/2014 | Bao ..................... H01S 3/302 359/334 |
| 2016/0072576 A1* | 3/2016 | Rad ..................... H04B 10/25 356/73.1 |
| 2018/0083413 A1* | 3/2018 | Rapp .................. H04B 10/077 |
| 2018/0239522 A1 | 8/2018 | Campbell et al. |
| 2018/0343077 A1 | 11/2018 | Al Sayeed et al. |
| 2019/0173602 A1 | 6/2019 | Al Sayeed et al. |
| 2020/0153502 A1* | 5/2020 | Buset .................. H04B 10/03 |

\* cited by examiner

| FIBER | AMP | OSC RATE | LAMBDA [nm] | OSC REACH @1550nm [dB] |
|---|---|---|---|---|
| NDSF | EDFA | GbE | 1510 | 31.9 |
| NZDSF | EDFA | GbE | 1510 | 31.3 |
| | | | | |
| NDSF | RAMAN | GbE | 1510 | 35.9 |
| NZDSF | RAMAN | GbE | 1510 | 35.3 |
| NDSF | RAMAN | GbE | 1517 | 36.9 |
| NZDSF | RAMAN | GbE | 1517 | 36.3 |
| NDSF | RAMAN | GbE | 1517 w/filter | 40.9 |
| NZDSF | RAMAN | GbE | 1517 w/filter | 40.3 |
| | | | | |
| NDSF | EDFA | OC-3 | 1510 | 34.0 |
| NZDSF | EDFA | OC-3 | 1510 | 33.5 |
| NDSF | EDFA | OC-3 | 1517 | 35.0 |
| NZDSF | EDFA | OC-3 | 1517 | 34.5 |
| | | | | |
| NDSF | RAMAN | OC-3 | 1510 | 39.0 |
| NZDSF | RAMAN | OC-3 | 1510 | 38.5 |
| NDSF | RAMAN | OC-3 | 1517 | 41.0 |
| NZDSF | RAMAN | OC-3 | 1517 | 40.5 |
| NDSF | RAMAN | OC-3 | 1517 w/filter | 45.0 |
| NZDSF | RAMAN | OC-3 | 1517 w/filter | 44.5 |

FIG. 8

| Fiber Type | | Min Raman Gain | Max Raman Gain |
|---|---|---|---|
| Non-Dispersion Shifted Fiber | NDSF | 6 | 15 |
| Enhanced Effective Area Fiber | ELEAF | 8 | 20 |
| True Wave Reduced Slope | TWRS | 10 | 24 |
| True Wave Classic | TWC | 10 | 23 |
| True Wave Plus | TWP | 10 | 23 |
| Lambda Shifted Single Mode Fiber | LS | 10 | 24 |
| Dispersion Shifted Single Mode Fiber | DSF | 10 | 24 |
| True Wave Reach | TWReach | 10 | 24 |
| Teralight | TERA | 8 | 20 |
| NDSF Low Water Peak | NDSF_LWP | 7 | 19 |
| Ultra-low-loss & Large effective area fiber | EX2000 | 6 | 15 |
| Pure Silica Fiber | PSC | 6 | 15 |

FIG. 12

AUTOMATIC REMOTE NODE TURN-UP PROCEDURE USING A RAMAN AMPLIFIER ON A STRETCHED FIBER SPAN

TECHNICAL FIELD

The present disclosure generally relates to optical networks. More particularly, the present disclosure relates to using an Optical Supervisory Channel (OSC), amplified by a Raman amplifier, to remotely configure a node or an optical fiber link that has been newly installed or recently repaired.

BACKGROUND

Generally, a communication network includes a number of nodes in communication with each other via a number of links, such as optical links. When new nodes or new links are installed in the communication network, certain setup steps are performed to prepare the nodes or links for operation within the communication network. Also, when a node or link is repaired, similar setup steps can also be performed to acclimate the repaired equipment to the network. These setup steps can also be referred to as a "turn-up" process. According to conventional practices, a stretched fiber span or optical fiber link may be installed (e.g., by burying the fiber optic cables underground) or a node may be installed (e.g., within a building), which may involve sending a "truck-roll" to a remote location where personnel can manually install the fiber or node. Once installed, the conventional method for setting up the newly installed fiber or node may include an expert (or "turn-up" expert) being sent to the remote location to turn-up the fiber or node to follow up a pre-defined installation procedure.

At times, a new fiber span may extend over an extremely long distance. Typically, long fiber spans require Raman amplification along with Erbium Doped Fiber Amplifiers (EDFAs). In this case, the turn-up expert may need to setup basic configurations manually on site. For example, these setup configurations may include entering basic node names, communications configurations, etc. Also, the turn-up expert may need to run Optical Time-Domain Reflectometry (OTDR) traces to check fiber characteristics and back reflections (e.g., counter-propagating Raman amplification) to ensure that the test results are at safe levels for Raman turn-up. While running the OTDR traces from one site, the turn-up expert has to manually confirm with a Network Operations Center (NOC) that no other traces are getting run for the same fiber from the other end.

The expert may also provision fiber types and other photonic configurations required to instantiate controllers. In many configurations (e.g., C-band+L-band fibers, Non-Zero Dispersion Shifted Fiber (NZDSF), etc.), a controller for a Raman amplifier may have a dependency to know or discover fiber types. The turn-up expert may turn on Raman amplification to a pre-planned target gain level as recommended by an offline planning tool. The offline planning tool may also recommend EDFA target gains, gain-switch modes, tilt, and Variable Optical Attenuation (VOA) losses based on fiber type and span loss. Once the Raman amplifier is up, the turn-up expert may have to readjust other gain/loss actuators since the measured Raman gain may not line up with planned target-gains.

Conventional practice to turn-up nodes with stretched fiber spans typically starts with sending truck-rolls to remote locations so that someone can manually install a node and follow up a pre-defined installation procedure. Typically, such long fiber spans require Raman amplification along with Erbium Doped Fiber Amplifiers (EDFAs).

This means that the installer has to set up basic configurations manually on site. The configuration information may include basic node names, communication configurations, protocols, etc. Also, the installer has to run OTDR traces to check whether fiber characteristics and back reflections are at a safe level for Raman turn-up. In some cases, the process may include counter-propagating a Raman amplifier. While running OTDR traces from one site, the installer on-site has to manually confirm with a NOC or Network Management System (NMS) that no other traces are being run from the other end of the same fiber.

The installer also provisions fiber types and other photonic configurations required to instantiate controllers of the NOC. In many configurations (such as C+L bands and/or for NZDSF), a Raman amplifier controller has a dependency to know or discover fiber type so that it can avoid Four Wave Mixing (FWM) on signals due to pump overlaps from C- and L-groups. The installer turns on Raman amplification to a pre-planned target gain level, along with EDFA target gain, gain-switch modes, tilt, and VOA losses, etc., as recommended by an offline planning tool based on fiber type and span loss. Once Raman is up, the installer may have to readjust other gain/loss actuators since the measured Raman gain may not line up with planned target-gain.

Conventionally, an OSC provides a wavelength on a link between two nodes for data communications therebetween. That is, OSCs are an additional wavelength in a Wavelength Division Multiplexing (WDM) system, usually outside the Erbium Doped Fiber Amplifier (EDFA) amplification band (e.g., at 1510 nm, 1620 nm, 1310 nm, or any other proprietary wavelength). This data communication is generally for Operations, Administration, Maintenance, and Provisioning (OAM&P) functionality, such as information about WDM signals on the link as well as remote conditions at the two nodes.

Additionally, the OSCs can provide remote software upgrades, network management connectivity, user data channel connectivity, etc. ITU standards suggest that the OSC should utilize an Optical Carrier (OC) OC-3 signal structure, though some have opted to use a 100 megabit Ethernet or another signal format. Typically, OSCs have a set maximum link budget. For example, a standard small form factor pluggable (SFP)-based OSC with as an OC-3 at 1510 nm has a link budget of about 42 dB. While 42 dB covers a large majority of fiber links, it does not cover festoon applications, channel crossings, or other high loss link applications. These high loss link applications can include Raman amplification; however, the presence of Raman amplifiers does not improve the link budget of a typical 1510 nm OC-3 OSC. That is, the high loss link applications do not realize any improvements with the OSC even with the Raman amplifiers on. Even if the OSCs were adapted to support Raman amplification, the OSCs would not support communication the high loss link applications if the Raman amplifiers were turned off. Additionally, conventional OSCs are typically a single point of failure thus an OSC failure cannot be distinguished from a link failure. This happens in high loss link applications because the signal power from the far end is indistinguishable from the locally generated Raman ASE. All of the foregoing presents difficult challenges in high loss link applications

BRIEF SUMMARY

According to one embodiment of the present disclosure, a system includes a processing device and a memory device configured to store a computer program having instructions. When executed, the instructions are configured to cause the processing device to turn on one or more Raman pumps of a Raman amplifier to a predetermined safe gain or power level and determine an estimated loss along a fiber optic span of a link between adjacent nodes of an optical network. Responsive to the estimated loss being greater than a reach of an Optical Supervisory Channel (OSC) signal along the link, the instructions are further configured to cause the processing device to adjust the gain or power level of the one or more Raman pumps.

According to another embodiment, a non-transitory computer-readable medium is configured to store computer logic having instructions that, when executed, cause one or more processing devices to turn on one or more Raman pumps of a Raman amplifier to a predetermined safe gain or power level, determine an estimated loss along a fiber optic span of a link between adjacent nodes of an optical network, and, responsive to the estimated loss being greater than a reach of an Optical Supervisory Channel (OSC) signal along the link, adjust the gain or power level of the one or more Raman pumps.

According to yet another embodiment, a method includes the steps of turning on one or more Raman pumps of a Raman amplifier to a predetermined safe gain or power level and determining an estimated loss along a fiber optic span of a link between adjacent nodes of an optical network. Responsive to the estimated loss being greater than a reach of an Optical Supervisory Channel (OSC) signal along the link, the method further includes the step of adjusting the gain or power level of the one or more Raman pumps.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 8 is a table illustrating the reach of an Optical Supervisory Channel (OSC) signal with Raman amplification, according to various embodiments.

FIG. 12 is a table illustrating typical achievable gains for Raman amplifiers in a C-band system for different types of fibers, according to various embodiments.

DETAILED DESCRIPTION

Figure 1:
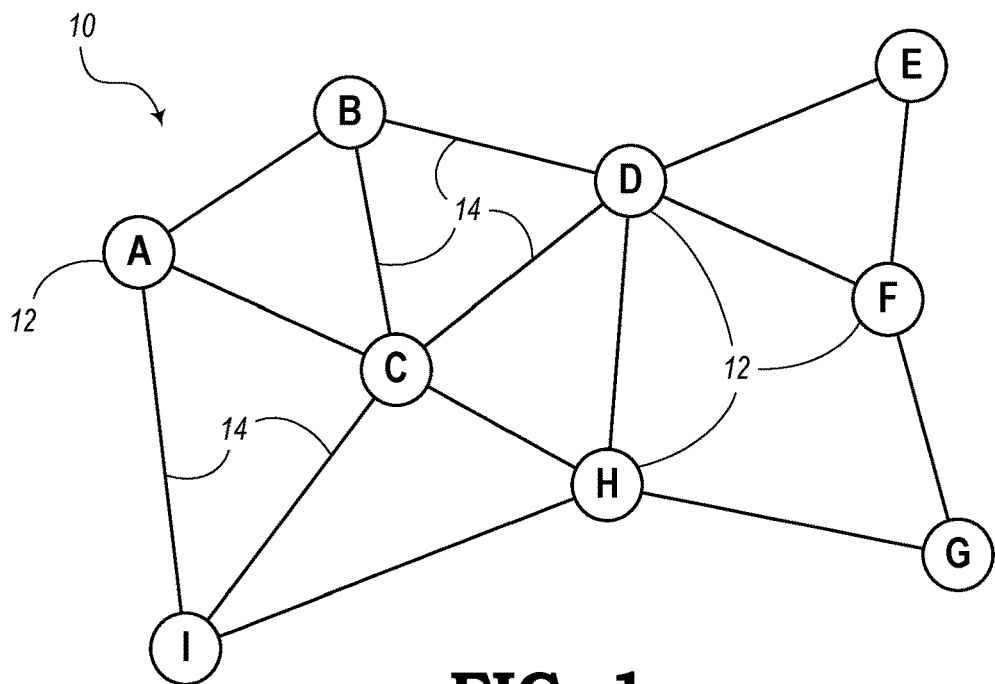
FIG. 1 is a diagram illustrating a network, according to various embodiments of the present disclosure.

The present disclosure relates to systems and methods for provisioning or turning-up equipment in an optical communication system. When a node or a stretched fiber span is installed in the optical communication system or when repairs have been made to existing equipment, a turn-up process may be run to configure the equipment in order that the equipment can operate properly within the system. In communication systems, provisioning involves the process of preparing and equipping a network to allow it to provide new services to its users. Provisioning may include an "initiation" of the network elements and may include altering the state of an existing service or capability. Network provisioning may also refer to the provisioning of customer's services to the network elements and is based on network planning and design.

An Optical Supervisory Channel (OSC) is a channel which uses an additional wavelength usually outside the EDFA amplification band (e.g., 1510 nm, 1620 nm, 1310 nm, or any other proprietary wavelength). The OSC carries information about the multi-wavelength optical signal as well as remote conditions at the optical terminal or EDFA site. It is also normally used for remote software upgrades and user (i.e., network operator) Network Management information. It is the multi-wavelength analogue to SONET's Data Communication Channel (DCC) (or supervisory channel). ITU standards suggest that the OSC should utilize an OC-3 signal structure, though some vendors have opted to use 100 megabit Ethernet or another signal format. Unlike the 1550 nm multi-wavelength signal containing client data, the OSC is terminated at intermediate amplifier sites, where it receives local information before re-transmission.

Normally, at the point when a node has been turned up manually, there is not much attention paid to OSC connectivity. If the OSC may receive an extra boost due to the presence of Raman amplification, then the turn-up expert can avoid the installation of additional communications channels, such as a General Communication Channel (GCC), to ensure accessibility to the remote node.

Compared with new installations, similar turn-up procedures may be performed if there is a fiber cut that takes place on the stretched fiber span. With a fiber cut, the recovery process again requires someone to physically go to the remote node location to follow similar steps to recover the remote node. This may also include turning on the Raman amplifier manually after the completion of a manual OTDR run and to re-establish communication.

Instead of sending a truck roll to the field, an alternative option may include ensuring Data Communication Network (DCN) drops on all stretched node locations. However, from the point of view of deployment for most network vendors, a DCN drop is not a practical solution for remote nodes due to extra capital expenditure to build the communications infrastructure. Also, conventional truck roll processes are time consuming for turn-up experts, expensive to physically transport the turn-up experts to the installation sites, and error prone due to the requirement to manually handle the fiber equipment.

FIG. 1 is a diagram illustrating a generalized example of a communication network 10. The communication network 10 includes a plurality of nodes 12 interconnected with each other via a plurality of fiber optic links 14. The nodes 12 may be network elements, switches, routers, etc. The fiber optic links 14 may be configured to propagate optical signals in one direction or bi-directionally between adjacent nodes 12 using any suitable routing and management protocols.

Figure 2:
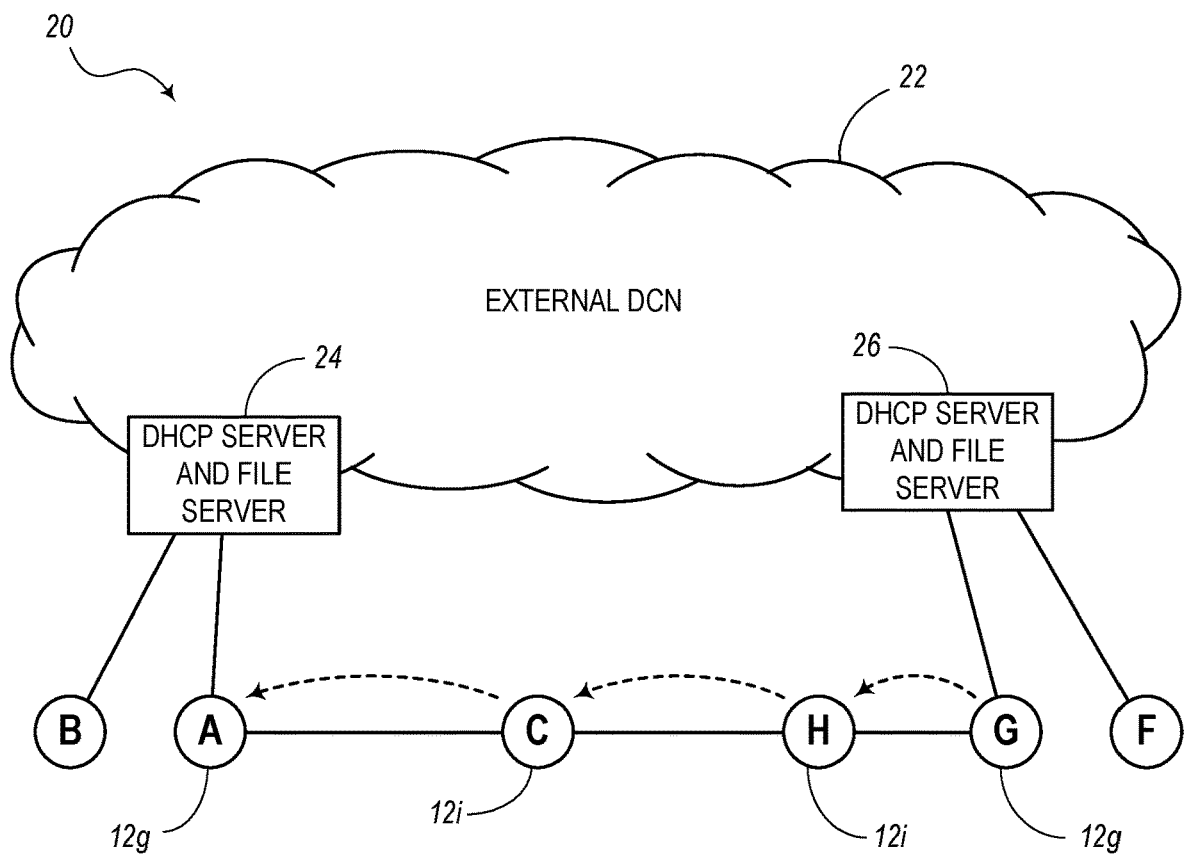
FIG. 2 is a schematic diagram illustrating an Optical Multiplex Section (OMS) of the network of FIG. 1, according to various embodiments.

FIG. 2 is a schematic diagram illustrating an embodiment of an Optical Multiplex Section (OMS) 20 of the communication network 10 of FIG. 1. In this embodiment, the OMS 20 includes an external Data Communication Network (DCN) 22. A first Dynamic Host Configuration Protocol (DHCP) server and file server 24 and a second DHCP server and file server 26 may be configured at edges of the external DCN 22. The DHCP servers and file servers 24, 26 provide network connectivity (e.g., IP address assignment) and software and configuration downloads. Nodes A and G in this example are configured as gateway nodes 12g connected to one of the DHCP servers/file servers 24, 26. The gateway nodes 12g may be configured as Reconfigurable Optical Add-Drop Multiplexers (ROADMs). Nodes C and H in this example are configured as Intermediate Line Amplifier (ILA) nodes 12i and are not connected directed to a DHCP server/file server. Thus, the ILA nodes 12i (i.e., nodes C and H) may access the external DCN 22 via one of the gateway nodes 12g.

For the optical node remote turn-up process, typically each ROADM node (i.e., nodes B, A, G, F) in the OMS 20 works as a gateway node 12g with direct possible connection to the customer's external DCN 22. The provisioning required to turn-up the gateway nodes 12g can be pushed down directly from a file server associated with the external DCN 22. The turn-up process in this case may include initializing settings, such as communication protocols, node names, identifiers, photonic configurations, etc. However, for any remote ILA node 12i at ILA sites (e.g., at nodes C and H), there is no direct access to the external DCN 22. Instead, the ILA nodes 12i rely on the communication access provided by the gateway nodes 12g. Once a node is configured, it establishes necessary communication with the next remote node via the Optical Supervisory Channel (OSC) and starts working as a relay agent to transfer necessary files to configure the remote nodes. Thus, the OSC enables turn-up of the nodes without an expert being present at the node itself, provided that OSC communication is unhindered. This remote turn-up process may be referred to as a Zero Touch Provisioning (ZTP) process, where processes between nodes of the file servers 24, 26 are automated.

Figure 3:
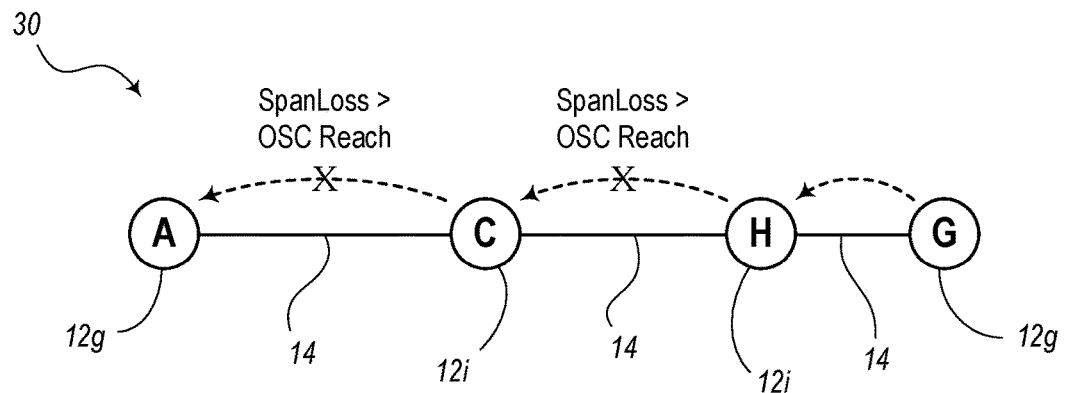
FIG. 3 is diagram illustrating the nodes of the OMS of FIG. 2, according to various embodiments.

FIG. 3 is diagram illustrating the nodes A, C, H, and G of the OMS 20 of FIG. 2. A problem that may arise in the OMS 20 is that the automatic turn-up process for remote nodes completely depends on the communication establishment and auto-discovery of far end nodes (e.g., ILA nodes 12i) achieved through OSC signals running between the nodes. However, at times, the distance between adjacent nodes and/or the optical attenuation or loss along the fiber optic links 14 may exceed the "reach" of the propagation of the OSC signals. In other words, this process works if the distance between two neighboring nodes remains within the reach of the OSC so there is connectivity.

If one or more fiber spans (i.e., length of fiber optic link 14 between adjacent nodes, such as A-C, C-H, and H-G) between two gateway nodes are above the OSC reach, then the remote "un-provisioned" node (e.g., ILA node 12i) fails to establish communication with the gateway nodes 12g. Typical OSC reach for Gigabit Ethernet (GbE) plugs are 32 dB and for OC-3 plugs are around 34 dB. That means for any stretched fiber spans beyond such OSC reach, the remote automated node configuration process does not work.

To extend the OSC reach, long fiber spans may be configured with amplification components for amplifying the signals. For example, these long fiber spans may use Raman amplifiers and Erbium Doped Fiber Amplifiers (EDFAs). During installation of a node, as mentioned above, an installer may manually set up basic configurations on the site, run OTDR traces, confirm with the NOC that no other traces are being run from the other end, provision fiber types and other photonic configurations required to instantiate controllers, turn on the Raman amplifiers and EDFAs pre-planned target gain levels or power levels, and readjust gain/loss actuators as needed.

By executing the turn-up process remotely, as described in the present disclosure, there is no requirement that the installer or other expert must physically be present at the node to manually enter initialization parameters and other set-up characteristics for proper network element operation. In addition to perform turn-up remotely, the embodiments of the present disclosure also solve the issue that arises when a fiber span loss exceeds the OSC reach. There may be different ways to resolve the long fiber span problem while also enabling remote turn-up.

At the point when a node is installed (or repaired) and is physically ready to be put into commission, the conventional turn-up process would include turning up the node manually, which does not require consideration of OSC connectivity. However, if the OSC receives an extra boost due to Raman amplification, then the installer can avoid additional communication channel installation (e.g., General Communication Channel (GCC)) to ensure accessibility to the remote node. Also, if a fiber cut takes place on the stretched fiber span, the recovery process requires that someone be sent to the remote node location to follow similar steps to recover the remote node by turning on Raman manually after the completion of manually coordinated OTDR runs, and to re-establish communication.

An alternative option, instead of sending a truck roll to the field, is to ensure DCN drops on all stretched node locations. Again, from the point of view of many network vendors during deployment, this is not a practical solution for remote nodes due to extra capital expenditure to build the communications infrastructure.

The present disclosure focuses on remote turn-up process for stretched fiber spans that extend beyond the typical OSC reach. Nodes with OSC reach may receive the advantage of a remote automatic turn-up process, referred to as ZTP. In this process, a node gets automatically configured with node names, unique identifiers, IP addresses for communications setup, photonic configuration setup to instantiate controllers, etc. However, for stretched fiber spans that extend beyond the OSC reach, a remote turn-up process does not exist in conventional systems.

Conventional procedures involve sending truck-rolls to the field to manually turn-up a node by configuring a node step-by-step and coordinating with the NOC to avoid network level correlation issues with other far end nodes. In addition, if a fiber-break takes place at a later time after the initial turn-up, trucks need to be rolled out again to run coordinated OTDR scans and to re-establish communication channel after the break is fixed. Such conventional processes are time-consuming, error-prone due to manual handling, and costly with respect to the expenses to initiate truck-rolls.

Typically, such long fiber spans require Raman amplification along with EDFAs. The OSC signal is typically out of the data traffic carrying transmission band. Although the OSC signal cannot pass through any EDFAs to receive any amplification, it still receives some Raman amplification on a Raman-amplified span, which can significantly extend the OSC reach to such an extent that it can be adequate for most of the typical stretched fiber span deployment.

The present disclosure takes advantage of the additional Raman amplification on the OSC signals. According to some embodiments, a process may be executed to automatically turn up the Raman amplifiers on a span at an optimal gain/power level that not only extends the OSC signal reach, but also avoids non-linear effects such as Four Wave Mixing (FWM), or double Rayleigh Back-Scattering. The process allows Raman pumps to be ON without any involvement from a node's shelf processors or external intervention. Once the OSC communication is established, the remote node is expected to be reachable for any automatic turn-up process. The proposed process works for initial remote turn-up procedures as well as for recovery from fiber-breaks.

It should be noted that Raman amplifiers may pose a threat to people, but more often will pose a danger to network equipment. For example, a Raman amplifier can provide a very high power (e.g., about 1 Watt), which is high enough to be able to burn fibers. Safety measures have been added to the installation of Raman amplifiers, such as using connectors instead of simply fusing the Raman amplifier directly to the fibers. With OTDR, a network operator can analyze if the high reflection is present or the amplifier has a dirty connector. In this case, the network operator may decide not to turn on the Raman amplifier. The connector or inter-lock connection can be used to limit the power to some degree, which can also be used to prevent damage to equipment.

Figure 4:
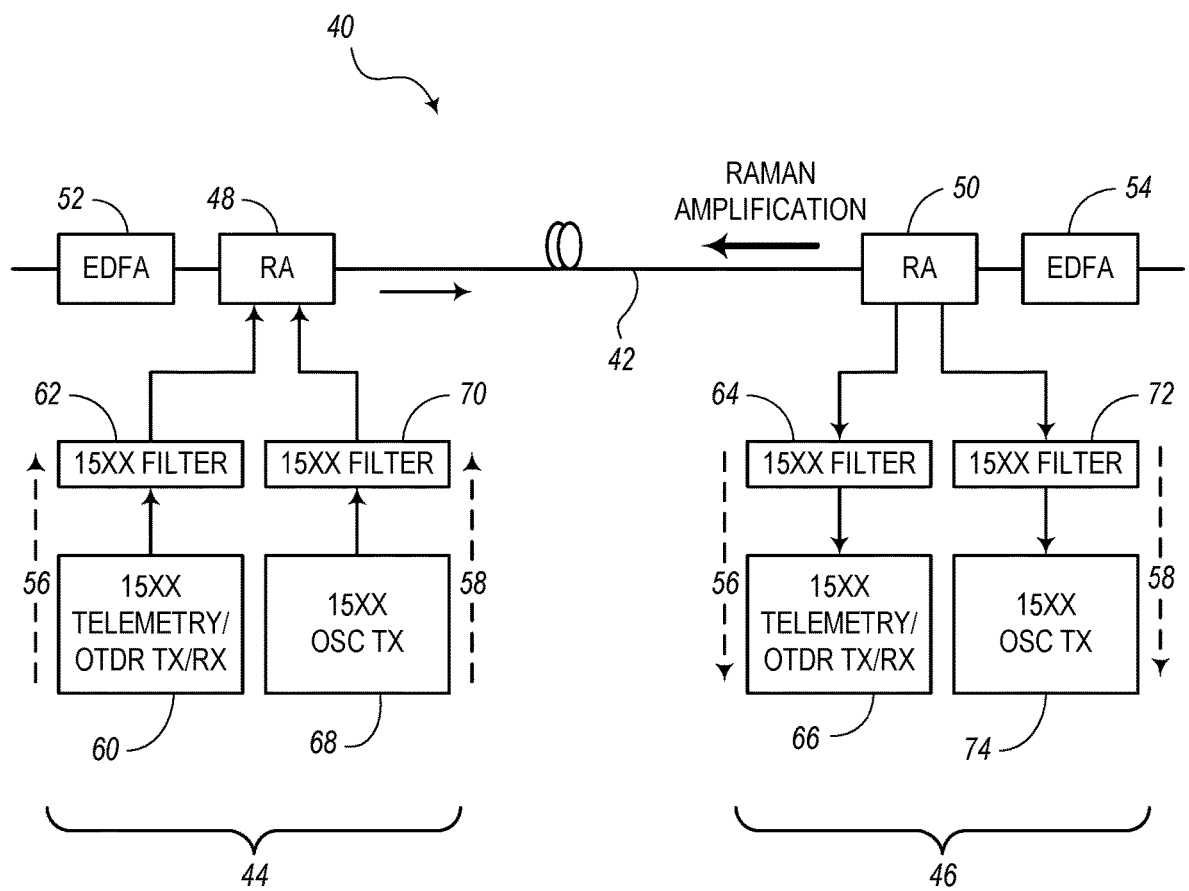
FIG. 4 is a block diagram illustrating an optical system from transmitting signals between two adjacent nodes, according to various embodiments.

FIG. 4 is a block diagram illustrating an embodiment of an optical system 40 for transmitting signals between two adjacent nodes, such as, for example, nodes A and C, where the span loss is greater than the OSC reach. In this case, a high loss link 42 or extended or stretched fiber span (e.g., optical fiber link 14 between nodes A and C) utilizes amplification from Raman amplifiers and EDFAs to extend the OSC reach.

In various exemplary embodiments, the present disclosure provides OSC systems and methods over high loss links. The OSC system may support a high bandwidth communication channel and a low bandwidth communication channel, working together over high loss links such as links with span losses greater than 50 dB. The high bandwidth communication channel can use high gain forward error correction (FEC) and a distributed Raman gain amplifier to support increased bandwidth relative to the low bandwidth communication channel. The low bandwidth communication channel operates on the same high loss span as the high bandwidth communication channel with limited performance when the distributed Raman gain amplifier is unavailable. The operations of the communication channels can be implemented in a state machine which provides communication between two nodes over a high loss span as long as there is fiber connectivity therebetween and regardless of whether Raman amplification is available. Advantageously, the OSC systems and methods enable a working telemetry channel in Raman enabled high loss links that can be used to 1) automate turn-up of Raman Amplifiers, 2) co-relate, isolate and trouble shoot faults, and 3) offer all the Raman safety features in the link. This removes the conventional requirement for manual user intervention for some or all of these functions. Advantageously, the OSC systems enable automation (e.g., through turn-up to shutdown) of high loss links reducing manual intervention requirements.

The low bandwidth communication channel can include use of a low bandwidth tone to allow signaling across the nodes at turn-up when the Raman amplifier is off. The tone can also be used to exchange a low bandwidth status word, to indicate the status of the nodes. The low bandwidth tone can also be used to enable and sequence diagnostic function such as OTDR trace, back reflection measurements, etc. Once the OTDR and other measurements are turned on, the Raman Amplifier can be enabled. This allows a higher capacity telemetry channel, i.e. the high bandwidth communication channel, to work across the link. The higher capacity telemetry channel operates within the Raman amplifier bandwidth and experiences gain from the Raman Amplifier. The high bandwidth communication channel includes a narrow bandwidth receiver filter to block the Amplified Spontaneous Emission (ASE) from the Raman amplification to improve the link budget of the telemetry signals. If there is any service interruption that results in the shutdown of the Raman amplifier, the communication between the nodes can revert to the low bandwidth communication channel.

The optical system of FIG. 4, in an exemplary embodiment, enables transmission of WDM signals over a high loss link 42. The optical system 40 includes a first node 44 (e.g., node A) and a second node 46 (e.g., node C) interconnected optically via the high loss link 42. For example, the high loss link 42 can be a fiber optic link with losses above 50 dB. For illustration purposes, FIG. 4 shows a unidirectional link in the high loss link 42 without showing additional components at each of the nodes 44, 46 such as transceivers, client equipment, etc. That is, FIG. 4 book ends the optical system 40 between optical amplifiers to illustrate the OSC systems and methods. The node 44 is the transmit side and the node 46 is the receive side. The high loss link 42 is bookended by Raman amplifiers 48, 50 at the nodes 44, 46, respectively, and EDFAs 52, 54 are also shown coupled to the Raman amplifiers 48, 50, respectively. From a signal propagation perspective, WDM signals (not shown) are transmitted through the EDFA 52 and the Raman amplifier 48 over the high loss link 42 to the Raman amplifier 50 and the EDFA 54. The Raman amplifier 50 can provide counter propagating Raman amplification over the high loss link 42. Optionally, the Raman amplifier 48 can provide co-propagating Raman amplification over the high loss link 42.

From an OSC/telemetry perspective, the optical system 40 includes two OSC/telemetry signals. As described herein, the OSC systems and methods relate to communications between two nodes across high loss links. The OSC systems and methods can refer to OSCs, telemetry channels, communications channels, management channels, etc., and may have the same functionality of a signal that enables communication between the nodes 44, 46 over the high loss link 42. In various exemplary embodiments, the optical system 40 supports two telemetry channels 56, 58 between the nodes 44, 46 that are tapped in/out prior to the EDFAs 52, 54. The telemetry channel 56 may be referred to as a low bandwidth communication channel (i.e., a 15XX telemetry or Optical Time Domain Reflectometer (OTDR) channel and the telemetry channel 58 may be referred to as a high bandwidth communication channel (i.e., an OSC). The telemetry channels 56, 58 can work in conjunction with one another. As described herein, 15XX is a wavelength between 1500 nm and 1599 nm, i.e. XX equals 00-99. In practical embodiments, 15XX for the channels 56, 58 will generally exclude the EDFA amplification band (e.g., 1535-1560 nm) as this is typically used for WDM signals.

The channel 56 can be the low bandwidth communication channel that is also configured to perform OTDR functionality through the Raman amplifier 48 as well as to monitor Raman amplification gain. The channel 56 is created by a 15XX telemetry/OTDR transceiver 60 at the node 44 which is inserted into a line associated with the high loss link 42 and the Raman amplifier 48 via a 15XX filter 62. For example, the channel 56 can be a 1527 nm wavelength, and the filter 62 can be a coarse filter combining the 1527 nm wavelength with a broadband range of wavelengths such as 1530-1565 nm. Thus, the filter 62 is configured to selectively insert the channel 56 into the high loss link 42. The channel 56 is received at the node 46 and selectively removed by a 15XX filter 64 that performs substantially the opposite functionality of the filter 62. Finally, the channel 56 is received at a transceiver 66 for demodulation of any information modulated on the channel 56. For example, the channel 56 can be modulated with an analog modulated (AM) tone, such as two discrete tones. The tone can be enabled only when the span loss is greater than a certain threshold and straightforward power detection is not reliable. The channel 56 is used to establish a low data rate between the two nodes 44, 46 that will work for very high span losses without requiring Raman amplification. Further, the modulation depth of the tone can be changed based on operating condition of the optical system 40. For example, the modulation depth can be high, before the Raman amplifiers 48, 50 are turned off and there is no traffic across the link. The modulation depth is reduced after the Raman amplifiers 48, 50 are turned on and there is traffic on the link. This reduces cross talk from the tone on the WDM payload channels. Also, the tone can be turned off if the high loss link 42 can support OSC 58 with the Raman amplifiers 48, 50 are turned off. Also, in addition to providing the low bandwidth tones, the transceiver 60 can be used for OTDR and for monitoring Raman gain over the high loss link 42.

Concurrent with the channel 56, the optical system 40 can include the OSC 58 which can be a separate OSC wavelength (e.g., an OC-3 SFP pluggable module) that is used for the high bandwidth communication channel such as when the Raman amplifiers 48, 50 are on or where supported without the Raman amplifiers 48, 50 being on. The OSC 58 is created by 15XX OSC TX 68 at the node 44 which is inserted into a line associated with the high loss link 42 and the Raman amplifier 48 via a 15XX filter 70. For example, the OSC 58 can be a 1517 nm wavelength (or any other wavelength), and the filter 70 can be a coarse filter combining the 1517 nm wavelength with a broadband range of wavelengths such as 1530-1565 nm. Thus, the filter 70 is configured to selectively insert the OSC 58 into the high loss link 42. Collectively, the filters 62, 64, 70, 72 can be referred to as coarse WDM filters which are configured to add/drop wavelengths out of the EDFA amplification band (e.g., 1530-1565 nm) with the EDFA amplification band. The OSC 58 is received at the node 46 and selectively removed by a 15XX filter 72 that performs substantially the opposite functionality of the filter 70. Finally, the OSC 58 is received at a receiver 74 for demodulation of any information modulated on the OSC 58.

The channels 56, 58 can in principle be at the same wavelength. In an exemplary embodiment of the OSC systems and method, separate wavelengths are used by the channels 56, 58 to allow for redundancy in link monitoring and also preserving a legacy OSC link (Coarse Wavelength Division Multiplexing (CWDM) SFPs with CWDM drop filters). There are other possible benefits to having two different wavelengths for the channels 56, 58 besides providing redundancy. First, as discussed herein, the channels 56, 58 can be used to provide an estimate of Raman gain of the Raman amplifiers 48, 50. In an exemplary algorithm, fiber loss of the high loss link 42 can be set at a baseline with the Raman amplifiers 48, 50 off. Once the Raman amplifiers 48, 50 are activated, the different in loss can be used to estimate Raman gain of the Raman amplifiers 48, 50. For example, the channel 56 can be received at a first power level with the Raman amplifiers 48, 50 off and a second power level with the Raman amplifiers 48, 50 on; the difference being indicative of gain associated with the Raman amplifiers 48, 50. Also, differential loss measurements could be used to distinguish if the change in the apparent loss of the high loss link 42 is due to change in distributed Raman Amplifier gain or change in fiber loss. One of the wavelengths of the channels 56, 58 can be selected so that the Raman gain is low or zero, while the other wavelength of the channels 56, 58 is selected so that the Raman gain is high. The differential loss change at the two wavelengths can be used to estimate if the loss change was primarily due to change in the fiber loss of change in Raman gain of the amplifier.

In another exemplary embodiment of the optical system 40, the channels 56, 58 can be propagating in opposite directions. For example, the channel 56 can be a co-propagating tone with WDM wavelengths and the OSC 58 can be counter or backward propagating relative to the channel 56 and the WDM wavelengths. The counter propagating OSC 58 would solve some of the issues described in the previous sections. For example, cross talk from OSC modulation impacts coherent WDM channels when they are co-propagating in the high loss link 42. However, if the OSC 58 is counter propagating, there is a large walk off between the OSC 58 and the WDM channels. Thus, the launch power of the OSC 58 channels can be increased significantly. Also, the OSC 58 can take advantage of Raman gain. In the counter propagating embodiment, the impact of Raman ASE is minimal, because the amplification happens at the beginning of the high loss link 42, rather than at the end of the high loss link 42, where the OSC 58 power is low. One of the benefits of a counter propagating (i.e., backward propagating) OSC (especially one with a low bandwidth like the OSC compared to the payload channels), is that the non-linear crosstalk is negligible due to the quick walk-off. Also, bidirectional OSC channels, i.e. the counter propagating OSC channel 58 and the channel 56, also has an advantage in reducing the time required for safety shutdown such as when there is both forward and backward propagating Raman amplifiers.

Figure 5:
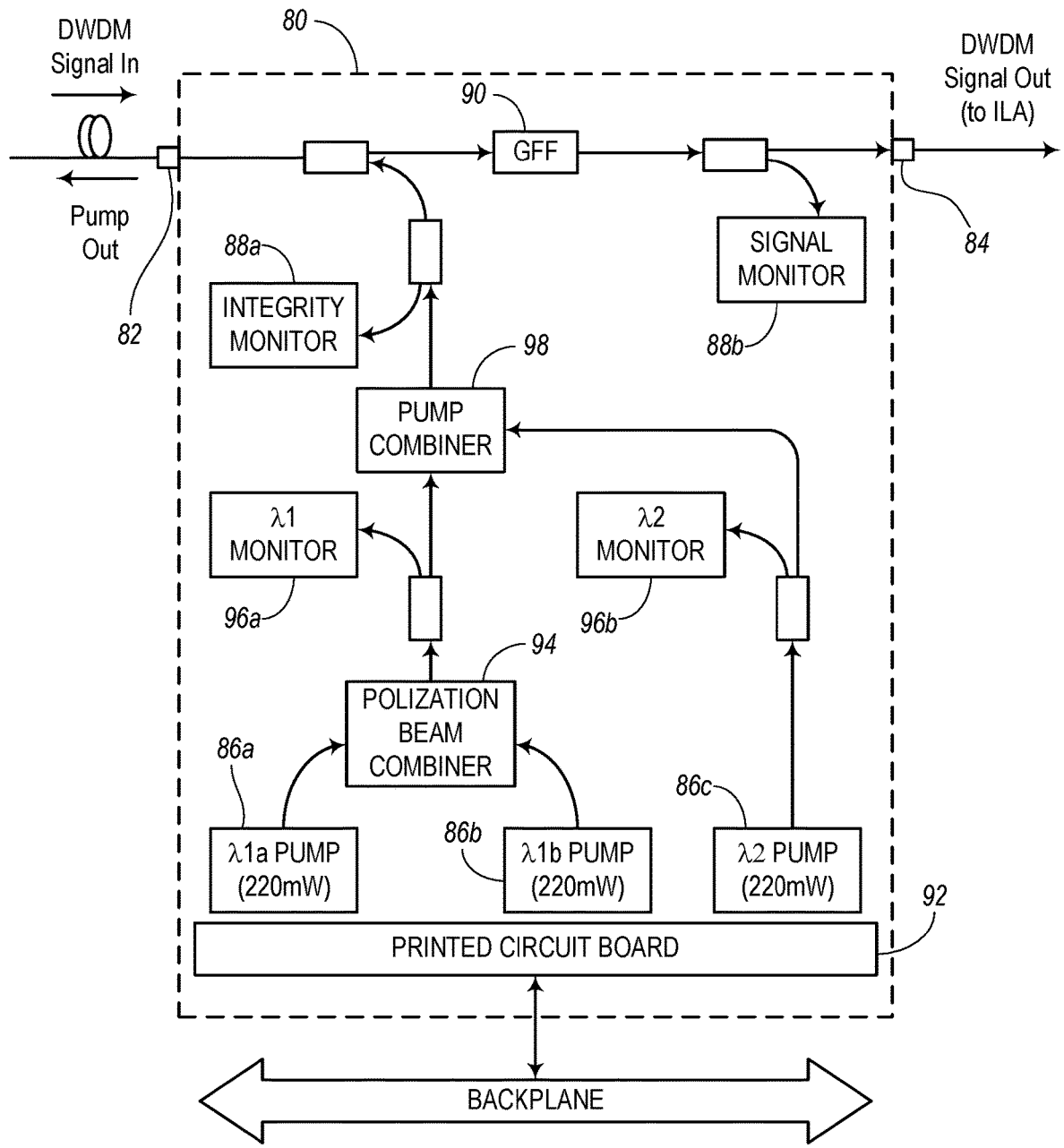
FIG. 5 is a block diagram illustrating a first Raman amplifier, according to various embodiments.

FIG. 5 is a block diagram illustrating a first embodiment of a Raman amplifier 80 that can operate with OSC. The Raman amplifier 80 can use back-reflection measurements for initial turn-up and can then start monitoring transmitted channels. The Raman amplifier 80 may be part of a circuit pack that provides 9 to 13 dB of Raman gain, depending on the fiber type. In a system configured with Integrated Line Amplifiers (ILAs): a) the maximum gain for a Non-Dispersion Shifted Fiber (NDSF) fiber plant may be 9.3 dB; b) the maximum gain for an ELEAF fiber plant may be 11.5 dB; and c) the maximum gain for a LS, DSF, or TW fiber plant may be 13.0 dB.

The Raman amplifier 80 may be used with gain-flattened Erbium-Doped Fiber Amplifiers (EDFAs). The Raman amplifier may inject up to 500 mW of pump power into the transmission fiber in order to obtain Raman gain in the signal band, thereby boosting the signal while maintaining a low noise figure. The insertion loss of the module may be 2.4 dB. No gain is provided at the service channel wavelength of 1625 nm; thus, the service channel experiences 0.4 dB loss.

The Raman amplifier 80 may be deployed as a pre-amplifier to an ILA, used in the a C-band bandwidth (e.g., from 1527.41 nm to 1565.50 nm) and may inject up to 500 mW of pump power into the transmission fiber at the end of each fiber span, counter-propagating to the signal. A majority of software controlling the Raman amplifier 80 may run at the local circuit pack level. This control consists of the pump power and gain control, calibration, and shutdown procedures. A Network Control Program (NCP) may be configured to determine the target Raman gain based on span loss, ILA-1 type, and fiber type. The NCP also adjusts the ILA operating point to compensate for the Raman amplifier 80.

The Raman amplifier 80 contains a gain-flattening filter to reduce the gain ripple to 0.4 dB typical. The Raman amplifier 80 has a number of use applications, including: a) use as a span extender to provide additional gain on high-loss spans; b) reduction of the hybrid (EDFA+Raman) noise figure for a higher Optical Signal-to-Noise-Ratio (OSNR); and c) reduction of the launch power out of the EDFA to reduce non-linear penalties, especially on Dispersion Shifted Fiber (DSF).

In this embodiment, the Raman amplifier 80 includes two connectors—a first connector 82 for receiving a DWDM signal from the span and a second connector 84 for outputting a DWDM signal out to the ILA. Both connectors 82, 84 may be located on a faceplate of the circuit pack. The Raman amplifier 80 injects up to 500 mW of Raman pump power into the transmission fiber at the end of each fiber span, counter-propagating to the DWDM signal ("Pump Out"). This pump light is generated by three pump lasers 86a, 86b, 86c, and each laser 86 has a nominal output power of 220 mW.

The total Raman pump power at each wavelength is monitored by a photodiode. An integrity monitor 88a measures the amount of pump light reflected back into the module. This is used in case of a fiber break or an open connection to trigger the safety shutdown. The signal power level after the Raman amplifier 80 is measured and is used together with the data obtained at startup to measure actual Raman gain. A Gain-Flattening Filter (GFF) 90 is inserted into the signal path to allow the precise control necessary to control Raman gain. The Raman Amplifier 80 contains a microprocessor on board a printed circuit board 92. The microprocessor controls the transfer of status/control data between the Raman Amplifier 80 and the NCP.

The Raman amplifier 80 further comprises a polarization beam combiner 94 for combining first and second pumps 86a, 86b. The combined signal is provided to a first wave monitor 96a and a pump combiner 98. The third pump 86c provide a wave to a second wave monitor 96b and the pump combiner 98. Also, the Raman amplifier 80 includes a signal monitor 88b that receives a signal from the GFF 90.

Figure 6:
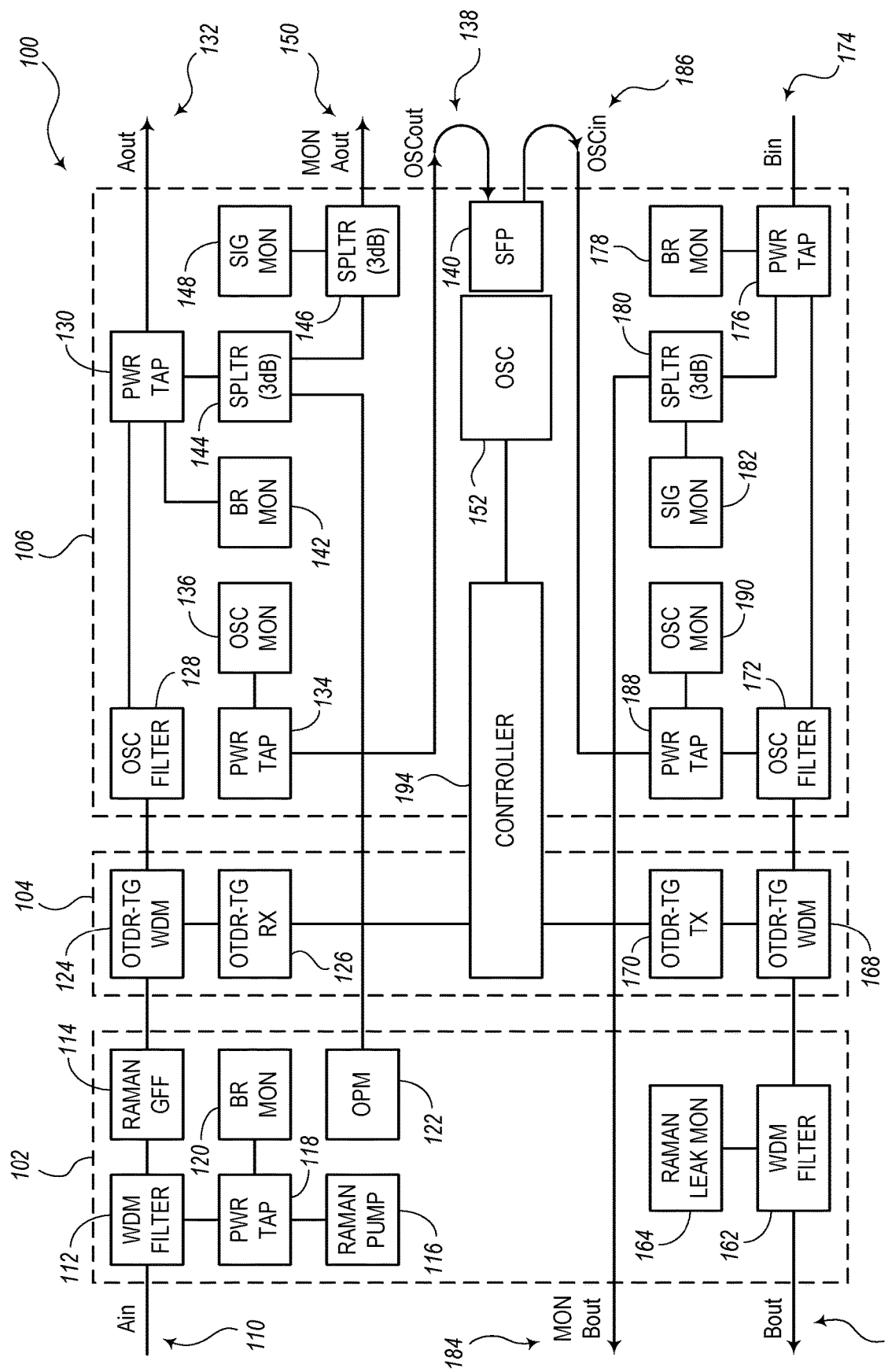
FIG. 6 is a block diagram illustrating a second Raman amplifier, according to various embodiments.

FIG. 6 is a block diagram illustrating a second embodiment of a Raman amplifier 100 for use in the optical system 40. The Raman amplifier 100 includes OSC down-shifting and is configured to look for a higher OSC rate or a lower OSC rate. With longer rates, it is possible to turn on the Raman amplifier 100.

According to various exemplary embodiments, the block diagram of FIG. 6 shows the Raman amplifier 100 as representing the Raman amplifier 50 of node 46 for use in the optical system 40 of FIG. 4. In other embodiments, the Raman amplifier 100 may represent the Raman amplifier 48 of node 44. The Raman amplifier 100 support two fibers, A and B, and in context of the optical system 40, the Raman amplifier 50 in the optical system 40 uses the A fiber and associated components, whereby the Raman amplifier 48 in the optical system 40 uses the A fiber and associated components. In other embodiments, the Raman amplifier 48 in the optical system 40 may use the A fiber and associated components, while the Raman amplifier 50 may use the B fiber and associated components.

The Raman amplifier 100 can be grouped into three internal subsystems 102, 104, 106, namely, a pump subsystem 102, an OTDR-TG (Telemetry Gain) subsystem 104, and an OSC subsystem 106. Of course, other configurations of the Raman amplifier 100 are also contemplated herein. For example, the functionality of the subsystems 102, 104, 106 can be integrated into a single system. Those of ordinary skill in the art will recognize that the Raman amplifier 100 is presented as an exemplary embodiment, and the OSC systems and methods described herein contemplate use with any embodiment of a Raman amplifier.

Also, it should be appreciated by those of ordinary skill in the art that the Raman amplifier 100 is depicted in an oversimplified manner, and a practical embodiment may include additional components and suitably configured processing logic to support known or conventional operating features that are not described in detail herein. Generally, the pump subsystem 102 is configured to provide the Raman amplification into the high loss link 42, the OTDR-TG subsystem 104 is configured to provide OTDR functionality and the functionality of the telemetry channel 56 (i.e., the low bandwidth channel), and the OSC subsystem 106 is configured to provide the functionality of the OSC 58 (i.e., the high bandwidth channel). The functionality and the components associated with each of these subsystems 102, 104, 106 is now described from the perspective of the A and B fibers.

With respect to the A fiber, the Raman amplifier 100 (e.g., Raman amplifier 50) includes an $A_{in}$ port 110 which receives signals from an external fiber such as the high loss link 42. In the optical system 40, the $A_{in}$ port 110 is where the high loss link 42 connects to the Raman amplifier 100 (e.g., at the node 46). A 14XX/1550 WDM filter 112 receives the $A_{in}$ port 110 and is configured to send WDM wavelengths (e.g., 1500 and above) to a Raman Gain-Flattening Filter (GFF) 114 and simultaneously combine 14XX Raman pump wavelengths from a Raman pump subsystem 116. The 14XX Raman pump wavelengths are counter propagating to the WDM wavelengths. A small power tap 118 (e.g., 1-5%) can couple a portion off the connection of the Raman pump subsystem 116 to the 14XX/1550 WDM filter 112 to monitor for Raman back reflections (BR) via a BR monitor 120. An optical power monitor (OPM) 122 can also monitor an output of the A fiber.

The Raman GFF 114 is configured to flatten the spectrum of the various WDM signals following the Raman amplification in the external fiber. The Raman GFF 114 connects to an OTDR-TG WDM filter 124 in the OTDR-TG subsystem 104. The OTDR-TG WDM filter 124 is configured to separate the WDM wavelengths (e.g., 1530-1565 nm) from the telemetry channel 26 wavelength. As described herein, in an exemplary embodiment, the telemetry channel 26 wavelength can be 1527 nm. The OTDR-TG subsystem 104 includes an OTDR-TG receiver (RX) 126 coupled to the WDM filter 124. The OTDR-TG RX 126 is configured to receive the telemetry channel 26 wavelength and for the low bandwidth signal, demodulate any tones on the telemetry channel 26 wavelength. The WDM filter 124 also connects to an OSC filter 128 in the OSC subsystem 106. The OSC filter 128 is configured to split out the OSC channel 28 from the WDM wavelengths, i.e. similar functionality to the WDM filter 124.

An output of the OSC filter 128 for the WDM wavelengths connects to a small power tap 130 which taps off a portion of output power but provides the majority of the output power to an $A_{out}$ port 132 out of the Raman amplifier 50 to the EDFA 54. An output of the OSC filter 128 for the OSC 28 connects to a small power tap 134 which provides a small amount of power to an OSC monitor 136. The majority of optical power from the power tap 134 connects to an $OSC_{out}$ port 138 which connects to a receiver on an SFP module 140. Thus, the OSC 28 is formed through a DWDM SFP pluggable module or other types of pluggable modules. The OSC subsystem 106 also includes a back reflection (BR) monitor 142 and a splitter (3 dB) 144 coupled to the power tap 130. The BR monitor 142 can check for any back reflections from the $A_{out}$ port 132. The splitter 144 connects to the OPM 122 and to another splitter 146 which connects to a signal monitor 148 and an external monitor port (MON $A_{out}$) 150. The OSC subsystem 106 also includes an OSC module 152 coupled to the SFP 140. The OSC module 152 includes various opto-electronic components for processing of the OSC 58.

With respect to the B fiber, the Raman amplifier 44 (or Raman amplifier 46 in other embodiments) includes a Bout port 160 which outputs signals to an external fiber such as the high loss link 42. In the communication network 10, the Bout port 160 is where the high loss link 42 connects to the Raman amplifier 48 at the node 44. The Bout port 160 is connected to another 14XX/1550 WDM filter 162 which splits off the 14XX bandwidth to a Raman leakage monitor 164. The 14XX/1550 WDM filter 162 is connected to another OTDR-TG WDM filter 168 which splits combines the telemetry channel 26 from an OTDR-TG transmitter (TX) 170 with other wavelengths (e.g., WDM wavelengths and the OSC 28). The OTDR-TG TX 170 is configured to transmit the channel 26 with the tones modulated thereon. The OTDR-TG TX 170 can also transmit a wavelength for the channel 26 to perform OTDR functionality.

The OTDR-TG WDM filter 168 is connected to another OSC filter 172 in the OSC subsystem 106. The OSC filter 172 combines the OSC 28 with WDM signals. For example, the WDM signals can be input through a Bin port 174 which connects to a small power tap 176. The majority of the output power from the power tap 176 is sent to the OSC filter 172 and smaller portions are provided to a back reflection (BR) monitor 178 and a splitter 180. The BR monitor 178 can be configured to check for back reflections from the Bin port 174. The splitter 180 connects to a signal monitor 182 and an external monitor port 184 (MON Bout). The SFP 140 provides the OSC 28 to an OSC input port 186 on the OSC subsystem 106 where it is connected to a small power tap 188 which taps a small portion of power to an OSC monitor 190 and provides the majority of power to the OSC filter 172.

A controller 194, which may be microprocessor-based, is configured to be connected to the OTDR-TG RX 126 and the OTDR-TG TX 170 in the OTDR-TG subsystem 104. The controller 194 is also configured to be connected with the OSC 152 in the OSC subsystem 106. The controller 194 may be configured to provide management or control signals for controlling the operations of the Raman amplifier 100, gain levels, power levels, status information, etc.

Figure 7:
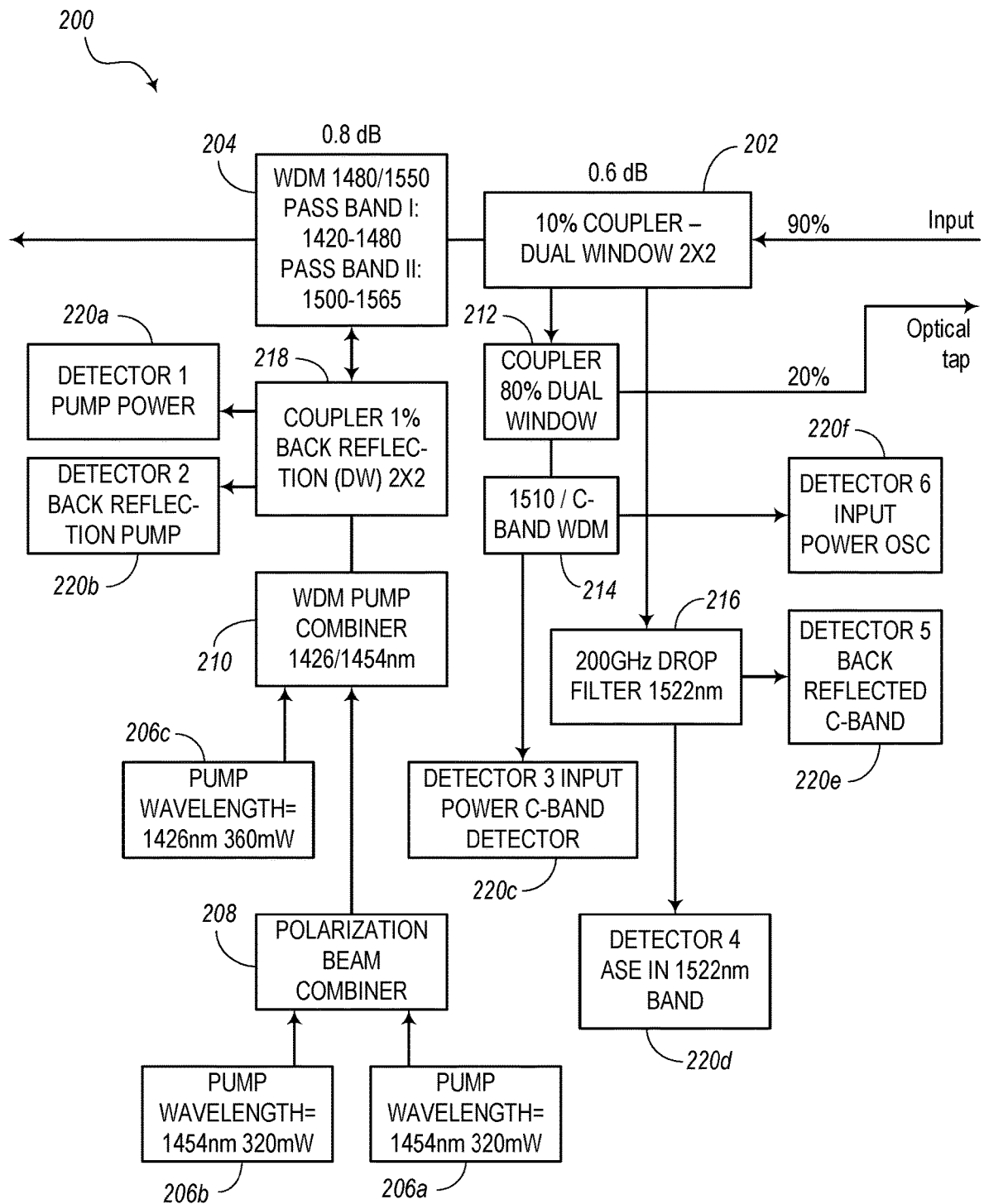
FIG. 7 is a block diagram illustrating a third Raman amplifier, according to various embodiments.

FIG. 7 is a block diagram illustrating a third embodiment of a Raman amplifier 200 that may represent the Raman amplifier 50 in node 46 of the optical system 40 of FIG. 4. The Raman amplifier 200 may be referred to in this embodiment as an ultra-span Raman amplification device and may include co-propagation and/or counter-propagation with customer's data signals. The Raman amplifier 200 may contain a Field Programmable Gate Array (FPGA) and a microprocessor-controlled Raman pump module for either C-band (1529-1565 nm) or L-Band (1570-1610 nm) distributed Raman amplification.

The Raman amplifier 200 includes a coupler 202 that receives an input and a WDM filter 204 that passes the signals along the line or link 42. The Raman amplifier 200 also include pumps 206a, 206b, 206c, such as laser diode pumps. The waves from pumps 206a and 206b are provided to polarization beam combiner 208. A WDM pump combiner 210 combines waves from pump 206c and polarization beam combiner 208. The Raman amplifier 200 also includes coupler 212 connected to the coupler 202, a C-band WDM filter 214 connected to the coupler 212, and a 200 GHz drop filter 216 connected to the coupler 202. A coupler 218 is connected between the WDM bandpass filter 204 and the WDM pump combiner 210. Furthermore, the Raman amplifier 200 include six detectors 220a, 220b, 220c, 220d, 220e, 220f connected to different components for measuring pump power, back reflection from the pumps, input power, ASE, back reflection from the input C-band, and input power of the OSC.

The pump module may include up to three pumps 206a, 206b, 206c or laser diodes at different wavelengths and/or polarizations, and features multiple independent laser safety mechanisms based on Automatic Power Reduction (APR). This allows both the Raman amplifier 200 itself and the optical system 40 within which it is installed to be classified as class 1 M laser products (according to IEC 60825 parts 1 and 2, and CDRH 21 CFR § 1040.10) with regard to eye and skin laser safely of the operating personnel, and also protects optical and electronic gear deployed along the lines. The same mechanisms are also used for alerting system management upon line deterioration and reduction in the amplifier distributed gain. In addition to the pump module, the Raman amplifier 200 includes redundant user replaceable 48V DC power supplies and cooling fans, as well as a communication module supporting the Small Network Management Protocol (SNMP) through a standard Ethernet RJ45 connector.

The Raman pump may experience Four Wave Mixing (FWM) issues. However, according to the present disclosure, processes for automatic Raman turn-on to enable OSC on long spans may be provided. In some cases, the system may include FWM avoidance while running the Raman turn-on procedure. The present disclosure may be focused on using Raman gain and default behavior of Raman amplifiers to increase OSC reach in order to allow remote turn-up of long fiber spans. Combining Raman gain for OSC within the realm of default Raman behavior is not disclosed in conventional systems.

Different algorithms for processing Raman amplifiers may be used for implementing the possible interactions of OSC with Raman gain parameters. Also, the present disclosure may utilize automatic shutdown/restart mechanisms on long fiber spans as well.

Automatic Raman turn-on can be used to enable OSC on long fiber spans. This may include turning on Raman pumps automatically on a remote link, without any user intervention or without any interactions with an external processing unit, such as a shelf or node processor, Software-Defined Networking (SDN) controller, etc., or other type of intervention. Also, this may be accomplished before any shelf-commissioning and adjusting of pump powers dynamically to bring up OSC connectivity.

FIG. 8 is a table illustrating an example of the reach of an Optical Supervisory Channel (OSC) signal with Raman amplification. The OSC signal, even though it is slightly outside of the regular transmission band, receives some Raman amplification, which can significantly increase its reach. In some cases, by choosing an OSC wavelength closer to the transmission band, and with additional filtering to cancel broadband noise level before OSC reception, it is possible to increase the reach by about 40-50 km in a Raman amplified span, compared to a non-Raman amplified span. In a stretched fiber span environment (e.g., typically greater than about 140 km), the additional OSC reach can add significant value. For a stretched (long) fiber span, if Raman amplification can be ensured for a given link, the remote communication establishment and automatic node configuration feature can be extended for remote nodes up to about 200 km.

According to various embodiments of the present disclosure, a proposed approach is to turn on Raman pumps automatically for any given fiber link at an optimal gain/power level that can extend OSC signal reach, but avoids non-linear effects (e.g., Four Wave Mixing (FWM) or double Rayleigh Back-Scattering). Each Raman amplifier (e.g., Raman amplifier 80, 100, 200) may be equipped with a telemetry signal (e.g., along telemetry channel 56). As soon as the telemetry signal clears Loss of Signal (LOS) on the local Rx, the expectation is that the OTDR may run automatically to check if the back-reflection and point-losses into the fiber are at a safe level to turn Raman pumps on. This safe level may be referred to as a "go" status for the Raman amplifier.

If the OTDR status is "go," the Raman pumps may be turned on automatically. At this point, the shelf processor of the node and any other commissioning may or may not be configured, which may mean that the fiber type is not known. Since there is no communication with the far end node at this point, any other automated process to discover fiber type will not work.

However, for C+L, the OSC wavelength is at the middle of the C- and L-transmission bands (i.e., 1568.36 nm). At such a spectral location for NZDSF fibers (e.g., TWRS or ELEAF), there may be a risk of experiencing FWM due to overlaps between two groups of Raman pumps that will corrupt any other traffic signals, including the OSC. Since the fiber type is not known at this point, the proposed approach avoids turning on two groups of Raman pumps at the same time, in order to remain safe for the NZDSF fibers. This may lose some gain for NDSF fibers, which has no risk of FWM, but will still allow enough amplification to extend the OSC reach.

Similarly, if the span loss is too low to turn on Raman pumps at high power level, it may generate double Rayleigh Scattering, which will corrupt the transmission signals. To avoid this situation, the proposed method uses received power at the telemetry signal as an indicator to estimate a span loss. The Raman pumps may be launched to achieve a target gain or power level that is safe, while avoiding double Rayleigh Scattering.

Figure 9:
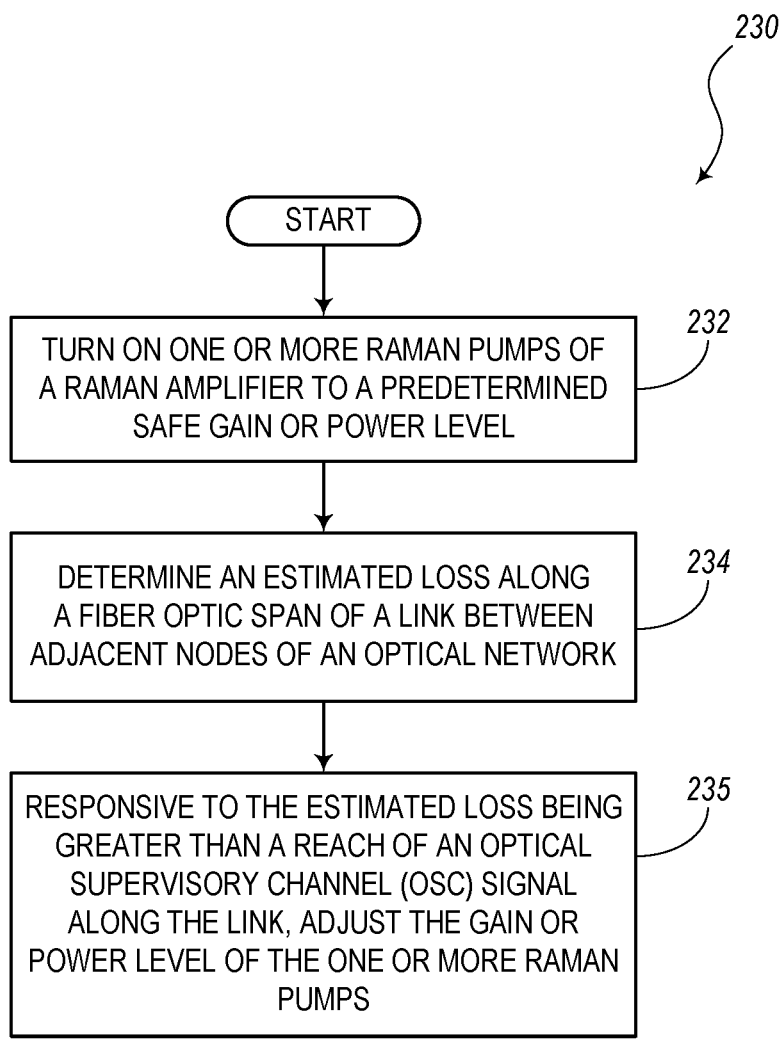
FIG. 9 is a flow diagram illustrating a process for adjusting Raman pumps based on the reach of OSC signals, according to various embodiments.

FIG. 9 is a flow diagram illustrating an embodiment of a process 230 for adjusting Raman pumps based on the reach of OSC signals. In this embodiment, the process 230 includes a step of turning on one or more Raman pumps of a Raman amplifier to a predetermined safe gain or power level, as indicated in block 232. The process 230 further includes the step of determining an estimated loss along a fiber optic span of a link between adjacent nodes of an optical network, as indicated in block 234. The process 230 further includes, responsive to the estimated loss being greater than a reach of an Optical Supervisory Channel (OSC) signal along the link, the step of adjusting the gain or power level of the one or more Raman pumps, as indicated in block 235.

The process 230 may be further defined or may include additional steps according to other embodiments. For example, the predetermined safe gain or power level may be set to a level for avoiding pump overlaps between a C-band and an L-band and for avoiding damage to the fiber optic span. Responsive to the estimated loss being less than the reach of the OSC signal, the process 230 may include the step of performing a gain-scanning process to find a range between minimum gain and maximum gain and may also include the step of adjusting the gain or power level of the one or more Raman pumps.

In some embodiments, the process 230 may further comprise the steps of a) determining if a fault on the link has cleared, b) running an Optical Time Domain Reflectometry (OTDR) trace on the link, and c) turning on one or more Raman pumps when the OTDR trace returns an acceptable point loss and back reflection to determine when the Raman amplifier has a "ready" or "go" status. According to some embodiments, the one or more Raman pumps can be turned on without knowing the OSC reach and/or without knowing the results of the OTDR trace. The process 230 can also include the step of determining the estimated loss based on received telemetry signal power at a near end of the link and transmit power from a far end of the link. Responsive to the estimated loss being greater than the reach of the OSC signal, the process 230 may include the step of leaving the one or more Raman pumps on until forced off According to some embodiments, the process 230 may further comprise the steps of a) accessing an OSC receiver power and Loss Of Frame (LOF) condition, b) responsive to the OSC signal being in the LOF, turning the one or more Raman pumps on, c) monitoring an OSC Raman gain and the LOF condition, and d) responsive to a maximum LOF being greater than the OSC Raman gain, freezing the one or more Raman pumps. In this example, responsive to the maximum LOF being less than the OSC Raman gain, the process 230 may include increasing the power of the one or more Raman pumps in a gradual step.

Figure 10:
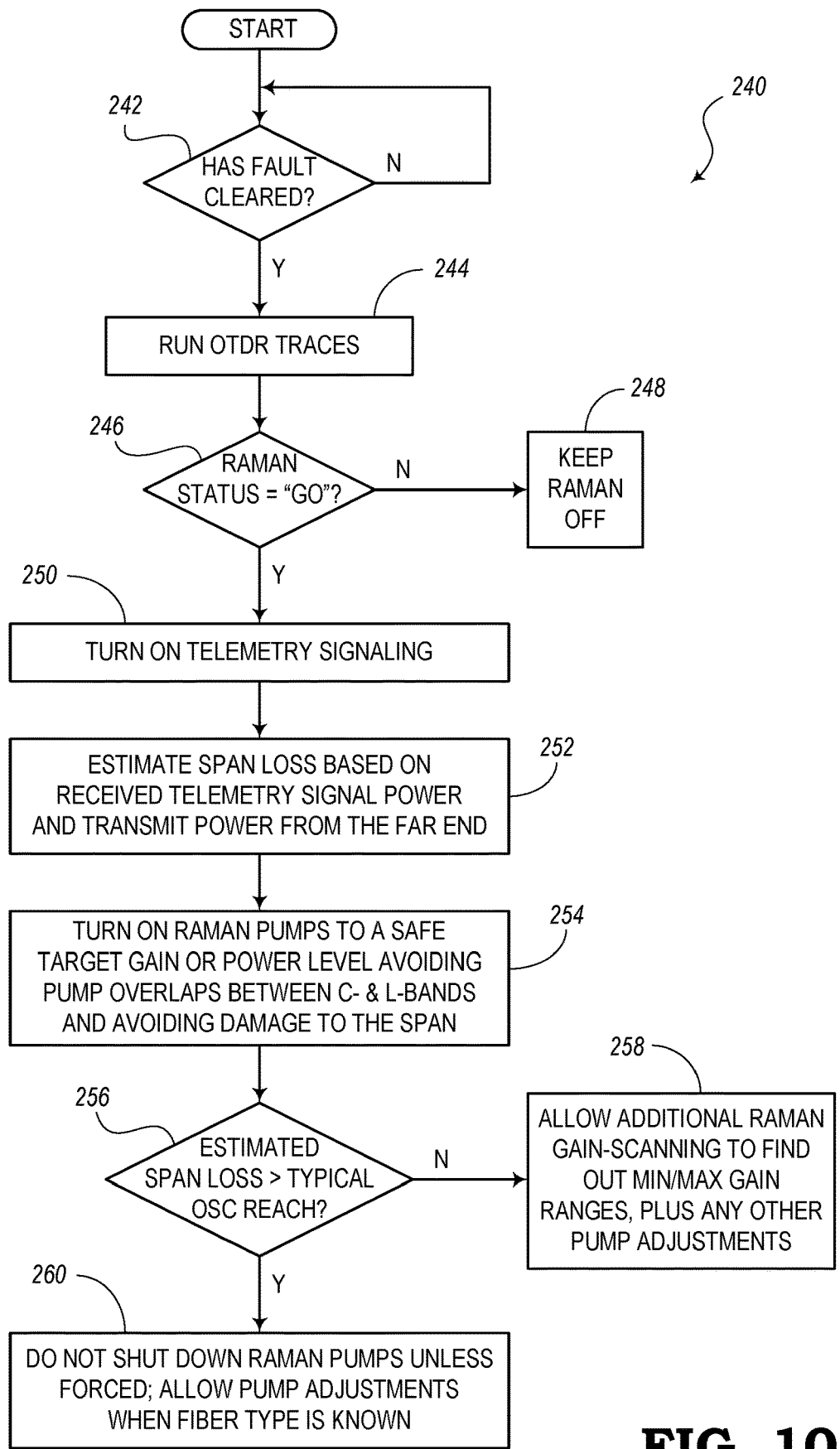
FIG. 10 is a flow diagram illustrating a process for determining a target gain or power level of a Raman amplifier, according to various embodiments.

FIG. 10 is a flow diagram illustrating an embodiment of a process 240 for determining a target gain or power level of a Raman amplifier. The process 240 includes determining if a fault has cleared, as indicated in decision diamond 242. The fault may be an optical line failure, an Automatic Laser Shut-Off (ALSO) condition, or other types of faults. When the fault has been cleared, then the process 240 proceeds to block 244, which indicates that OTDR traces are run. Next, the process 240 includes determining if the status of the Raman is "go," as indicated in decision diamond 246. The "go" status means that the Raman amplifier is ready for operation, such as when the OTDR trace returns an acceptable point loss and/or back reflection measurement. If it is not ready for operation, the method 240 goes to block 248, which indicates that the Raman is kept off. If decision diamond 246 determines a "go" status, the method 240 proceeds to block 250, which includes the step of turning on or enabling telemetry signaling. The Raman pumps may be turned on automatically without actually knowing the OSC reach or OTDR trace results.

Furthermore, the process 240 of FIG. 10 includes estimating span loss based on received telemetry signal power and transmit power from a far end of the fiber, as indicated in block 252. Then, the Raman pumps are turned on to a safe target gain or power level (block 254), where the safe level is configured to avoid pump overlaps between the C-band and the L-band and to avoid damage to the fiber optic span. The process 240 also includes the decision diamond 256, which determines if the estimated span loss (from block 252) is greater than the typical OSC reach. If the OSC reach in this case is acceptable (i.e., "N" in block 256), then the process 240 goes to block 258, which includes the step of allowing additional Raman gain-scanning to find out the gain ranges between the minimum and maximum, plus any other pump adjustments. However, if it is determined in decision diamond 256 that the estimated span loss is greater than the typical OSC reach, then the process 240 proceeds to block 260, which indicates that a step is executed to not shut down the Raman pumps (unless forced) and to allow pump adjustments when the fiber type is known.

Additionally, the process 240 can be simplified by not turning up Raman pumps automatically if the estimated span loss ends up being well below a typical OSC reach. In addition, if the Raman card has direct communication to the OSC facility to read OSC receiver Loss of Frame (LOF) information (e.g., when OSC is in the same circuit pack as the Raman), then the automatic Raman pump turn-up process can be further optimized.

As soon as a fiber-cut or an Optical Line Fail (OLF) condition clears, the OTDR can start automatic traces on the Raman fiber (e.g., in the counter-propagating direction). If the OTDR traces are returned as satisfactory (i.e., "go") for Raman pumps to be turned on, then the process 240 includes a) turning on telemetry signaling, b) estimating span loss based on locally received telemetry signal power and estimating typical transmit power from the far end, and possibly c) modulating telemetry signal to transfer transmit power information from the far end to improve accuracy on span loss measurement.

Furthermore, the process 240 may include avoiding the step of turning on all pumps in the case of C+L Raman in order to avoid possible FWM in NZDSF fibers. The process 240 may also include the steps of defining a safe Min/Max target gain or power level that may be achievable for any known fiber types. For example, the target gain may be derived as below:

Expected Raman gain=Min(MaxGain, FiberLoss−X dB); where X=6;

If (Expected Raman gain<MinGain), Set Target Raman gain=0;

else, Set Target Raman gain=Expected Raman gain.

For example, a typical Min/Max can be set as Min=5 dB, Max=15 dB that can be achievable for most commonly known fiber types.

All of the above processes may be performed without any intervention from a user or shelf processor and does not require any provisioning.

Therefore, the process 240 does not merely turn up a Raman amplifier automatically or optimizing Raman pumps to get OSC connectivity. The present disclosure does not merely a process for using the Raman to amplify the OSC. Instead, when the Raman amplifier is turned on, the process 240 of FIG. 10 may be executed. According to some respects, the workflow in the present disclosure is reversed from previous solutions. In other words, the Raman is turned on first (or the Raman gets turned on automatically without any kind of intervention). When the Raman amplifier determines that there is a certain fiber plug type, it may be turned on without any kind of processor intervention, or any kind of user intervention, which is essentially reversed from previous solutions.

Not only is the workflow reversed, but there are other differences from the previous solutions. When the Raman amplifier is turning on automatically, the turn-up module 314 (FIG. 13) can include logic to control a bootstrapping process or power-up process so it does not merely turn on blindly to full power. Instead, to prevent damage to equipment, the turn-up process may include a safe turn-up process to allow the Raman amplifier to be turned on safely and automatically on its own. The Raman amplifier comes up on its own without user intervention or external processing units. This is done in a diminished state. Also, the Raman amplifier does not do a full calibration, because more data would be needed for this. It is turned up enough so that the OSC can be carried through when the OSC needs to be pumped.

It should also be noted that normally an OSC signal is needed to turn on the Raman amplifier, and once it is on, the system is ready for operation. The present disclosure provides an automatic way to turn Raman on without having other types of communication, so that the system provides OSC communication to turn the real Raman on. This is part of the bootstrapping process. However, in some embodiments, it is not necessary to rely on OSC to turn the Raman on, but an OSC signal may be used to monitor gain.

In the present disclosure, the systems and methods bring up OSC because OSC provides the input indicating whether or not the link is good. The OSC also provides additional information on which the Raman may rely for turning on. In some embodiments, the Raman may be turned on by itself when its reflection criteria are matched to indicate if reflection is present. This kind of reflection criteria may be done by this elementary signaling, such that if those reflection criteria are met, the Raman can be turned on thereafter. This can be referred to as a "bootstrap" process, a "basic" level process, "minimal" level process, etc.

Figure 11:
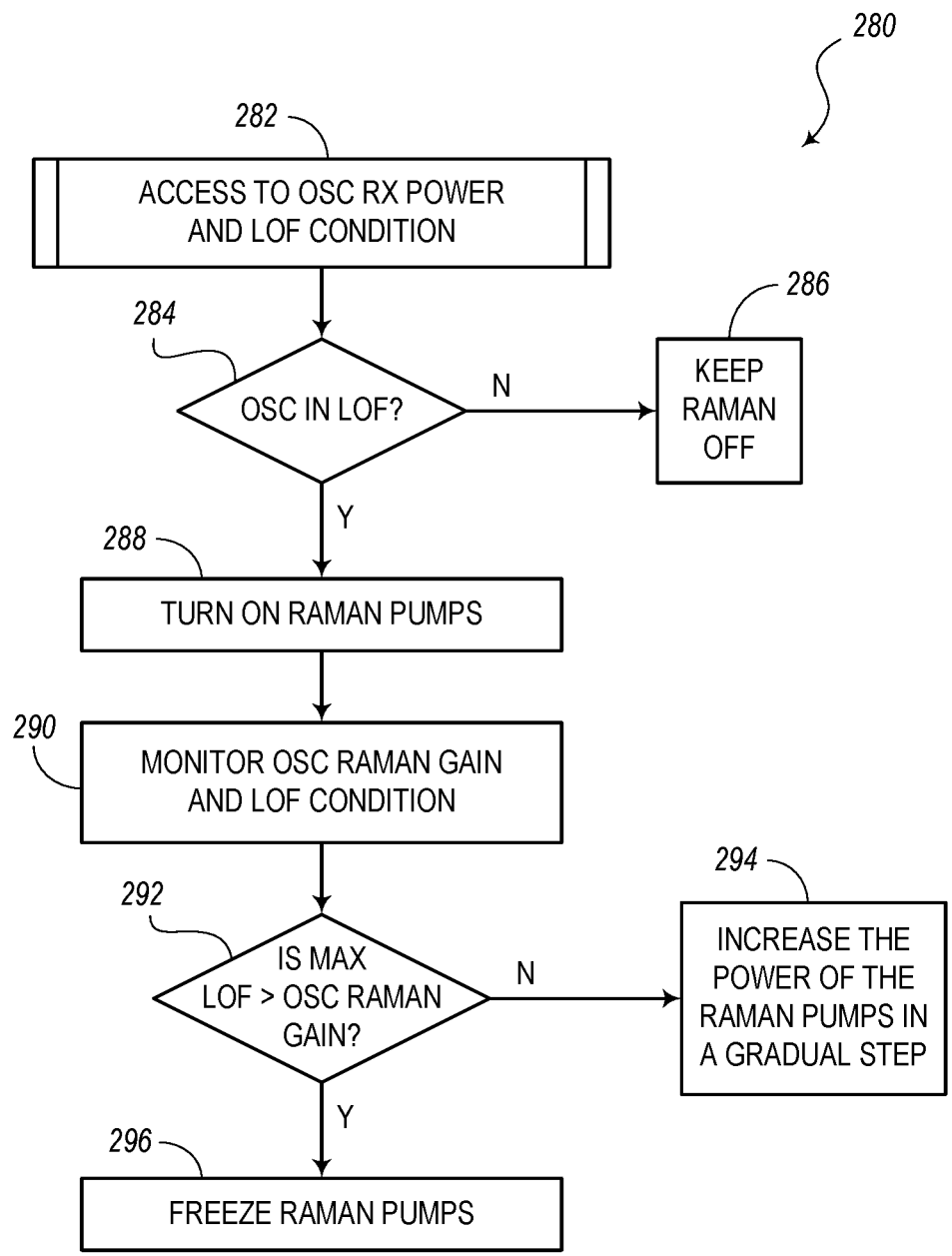
FIG. 11 is a flow diagram illustrating a process for further optimizing a Raman turn-up procedure, according to various embodiments.

FIG. 11 is a flow diagram illustrating an embodiment of a process 280 for further optimizing a Raman turn-up procedure. The process 280 may include gaining access to OSC receiver power and a Loss of Frame (LOF) condition, as indicated in block 282. Decision diamond 284 includes determining if the OSC is in LOF. If not, the Raman amplifier is kept off, as indicated in block 286. If it is determined in decision diamond 284 that the OSC is in LOF, then the process 280 proceeds to block 288. In block 288, the step includes turning on the Raman pumps.

When the Raman pumps are on, the process 280 further includes the step of monitoring OSC Raman gain and the LOF condition, as indicated in block 290. The process 280 proceeds to decision diamond 292, which determines whether the maximum LOF is greater than the OSC Raman gain. If not, the process 280 goes to block 294, which indicates the step of increasing the Raman pump powers in a gradual step. If the maximum LOF is determined to be greater than the OSC Raman gain, the process 280 proceeds to block 296, which includes the step of freezing the Raman pumps.

The additional optimization process 280 of FIG. 11 can be further simplified by not turning up Raman pumps automatically if the estimated span loss ends up being well below a typical OSC reach. In addition, if the Raman card has direct communication to the OSC facility to read OSC receiver LOF information (e.g., when OSC is in the same circuit pack as the Raman), then the automatic Raman pump turn-up process can be further optimized.

The process 280 may include monitoring the OSC Rx power and LOF condition before turning on the Raman pumps. If the OSC has LOF, then the process 280 may include a) starting with a safe gain/power level or pump power ratios for the Raman pumps, b) monitoring OSC Rx power and LOF condition, and c) compare the OSC Rx power and LOF condition with Raman off condition to estimate an OSC Raman gain. If the LOF clears (or if the expected maximum OSC Raman gain) is achieved, then the process 280 may be stopped. Otherwise, the process 280 may include gradually increasing the pump powers and monitor the OSC Raman gain/power level and LOF condition.

An important aspect of the present disclosure, according to various embodiments, is that the Raman can be turned on along the long spans where OSC cannot be detected without Raman gain. This process thereby may enable Zero Touch Provisioning of the device. The value of this capability can be beneficial for minimizing the cost and time required to turn up the equipment in the field. The systems and methods described herein are not disclosed in conventional systems.

One type of Raman amplifier is referred to as a "RED-C" Raman that uses local control. However, the RED-C Raman may be altered, according to the various embodiments of the present disclosure, to include the additional features that enable remote control of the turn-up process. Also, modifications to the Raman amplifier referred to as a "Circularly Polarized Luminescence (CPL) Distributed Raman (DRA) card." Although the conventional procedure for these Raman amplifiers included sending someone in the field to turn on the Raman manually, since it was not possible to talk to a remote node without OSC connectivity, the present disclosure overcomes these shortcomings by allowing remote control for Raman turn-up.

FIG. 12 is a table illustrating an example of achievable gains for Raman amplifiers in a C-band system for different types of fibers.

Figure 13:
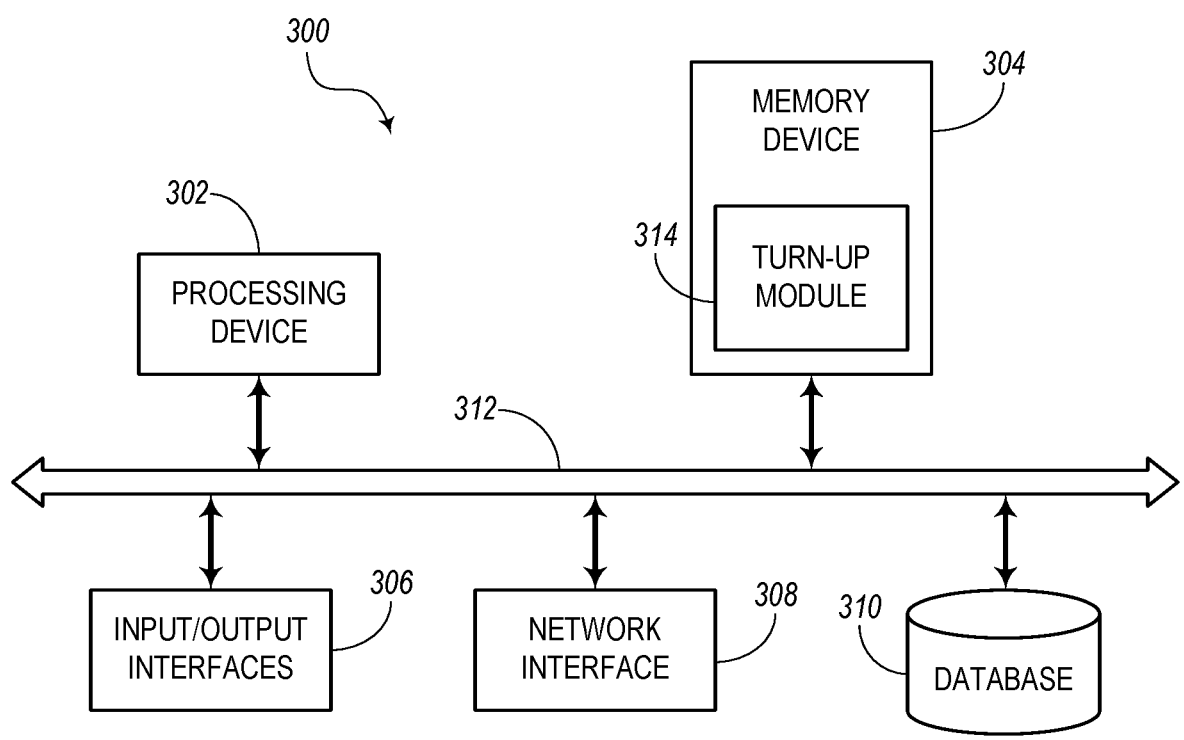
FIG. 13 is a block diagram illustrating an automatic turn-up system for turning up a Raman amplifier in an optical system, according to various embodiments.

FIG. 13 is a block diagram illustrating an embodiment of an automatic turn-up system 300 for turning up a Raman amplifier in an optical system. In this embodiment, the turn-up system 300 may be configured to perform any or all the features described in the present disclosure. According to one embodiment, the features described herein may be combined in a single system 300 or may be distributed to various locations throughout the network 10 (FIG. 1). In some embodiments, the turn-up system 300 may include logic (e.g., turn-up module 314) for causing the processing device 302 to execute various turn-up procedures.

Generally, the turn-up system 300 may be a digital computer that, in terms of hardware architecture, generally includes a processing device 302, a memory device 304, Input/Output (I/O) interfaces 306, a network interface 308, and a database 310. The memory device 304 may include a data store, database (e.g., database 310), or the like. It should be appreciated by those of ordinary skill in the art that FIG. 13 depicts the turn-up system 300 in a simplified manner, where practical embodiments may include additional components and suitably configured processing logic to support known or conventional operating features that are not described in detail herein. The components (i.e., 302, 304, 306, 308, 310) are communicatively coupled via a local interface 312. The local interface 312 may be, for example, but not limited to, one or more buses or other wired or wireless connections. The local interface 312 may have additional elements, which are omitted for simplicity, such as controllers, buffers, caches, drivers, repeaters, receivers, among other elements, to enable communications. Further, the local interface 312 may include address, control, and/or data connections to enable appropriate communications among the components 302, 304, 306, 308, 310.

The processing device 302 is a hardware device adapted for at least executing software instructions. The processing device 302 may be any custom made or commercially available processor, a Central Processing Unit (CPU), an auxiliary processor among several processors associated with the turn-up system 300, a semiconductor-based microprocessor (in the form of a microchip or chip set), or generally any device for executing software instructions. When the turn-up system 300 is in operation, the processing device 302 may be configured to execute software stored within the memory device 304, to communicate data to and from the memory device 304, and to generally control operations of the turn-up system 300 pursuant to the software instructions.

It will be appreciated that some embodiments of the processing device 302 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 302 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 306 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 306 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 308 may be used to enable the turn-up system 300 to communicate over a network, such as the network 10, the Internet, a Wide Area Network (WAN), a Local Area Network (LAN), and the like. The network interface 308 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 308 may include address, control, and/or data connections to enable appropriate communications on the network 10.

The memory device 304 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 304 may incorporate electronic, magnetic, optical, and/or other types of storage media. The memory device 304 may have a distributed architecture, where various components are situated remotely from one another, but can be accessed by the processing device 302. The software in memory device 304 may include one or more software programs, each of which may include an ordered listing of executable instructions for implementing logical functions. The software in the memory device 304 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 304 may include a data store used to store data. In one example, the data store may be located internal to the turn-up system 300 and may include, for example, an internal hard drive connected to the local interface 312 in the turn-up system 300. Additionally, in another embodiment, the data store may be located external to the turn-up system 300 and may include, for example, an external hard drive connected to the Input/Output (I/O) interfaces 306 (e.g., SCSI or USB connection). In a further embodiment, the data store may be connected to the turn-up system 300 through a network and may include, for example, a network attached file server.

Moreover, some embodiments may include a non-transitory computer-readable storage medium having computer readable code stored in the memory device 304 for programming the turn-up system 300 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 302 that, in response to such execution, cause the processing device 302 to perform a set of operations, steps, methods, processes, algorithms, functions, techniques, etc. as described herein for the various embodiments.

The turn-up module 314 may be configured in hardware, software, firmware, or any suitable combination thereof. In some embodiments, the turn-up module 314 may be stored in the memory device 304, as shown in FIG. 13, and configured as software that includes instructions for causing the processing device 302 to perform the turn-up procedures described in the present disclosure. The turn-up module 314 may be configured to determine the type of "pump cards" installed in the system that need to be turned on. The logic of turn-up module 314 may further include configuring the system based on the type of pump cards present. The logic also includes setting a target gain for the Raman amplifier. In a C+L-band system, even if seven pumps were present, the logic may include turning on only four of these pumps. Other setup configurations can be established by the turn-up module 314, particularly to allow the turn-up process to be conducted safely. For example, the setup configurations may include safe limits.

It may be noted that the term "stretch" fiber spans may refer to festoon links, terrestrial links, underground links, submarine (i.e., underwater) links, etc. A stretched fiber span may merely refer to a span that is long enough span that the OSC may rely on the amplification of a Raman pump to reach from one node to the next. Depending on the OSC rate, the span may have an optical attenuation of about 32 dB or higher.

According to some implementations, the turn-up procedures may include keeping communication with the Raman as an encrypted telemetry signal. The OTDR signals are transmitted along the link to the Raman, and when the OTDR criteria are satisfied, the go/no-go criteria may basically indicate that the back reflection is within the proper range for the Raman amplifier to be turned on and/or the point loss is at an acceptable level. When the reflection criteria are met, the Raman is turned on.

It should be noted that Raman cards are typically not turned on automatically, regardless of whether they are installed in a stretched fiber span. However, with the turn-up module 314 and other turn-up procedures described in the present disclosure, any Raman amplifier will require some confirmation of a go or no-go status. The system would need enough provisioning that the Raman can do a proper calibration. By the end of the time that the Raman provisioning is done, information such as fiber type and a level of provisioning may be applied so that the Raman can optimize its pumps and power levels the right way. If the fiber types and provisioning were known, it would be possible turn on Raman manually. However, given the advantages of the present disclosure, there would therefore be no point in doing so if it is unclear what the real network looks like.

In some embodiments, the scope of the present disclosure may include any type of automatic Raman turn-up process and does not necessarily include Raman amplifiers only on a stretched (i.e., long) fiber span. However, in various embodiments, a stretched fiber span may be more applicable because of the fact that the OSC signals have limited reach. Most of the details described herein refer to an environment of stretched fiber spans, which will include certain behaviors. However, over shorter spans, other behaviors may be monitored and used to modify or recalibrate the configurations (e.g., gain target, etc.) of the turn-up process as needed. In a shorter span environment, the Raman may be able to be turned on automatically, which may include some steps of re-calibration and optimization to account for the specific network.

There are networks where a stretched fiber span of an optical link may be very long. For example, an estimated span loss (e.g., estimated optical attenuation or estimated optical loss) of the fiber optic span may be determined such that the loss would be greater than the reach of the OSC signal under normal conditions. In other words, it is determined if the OSC signal would attenuate to a level that would not be recognizable or too far attenuated that it would not be able to propagate over the entire length of the fiber optic span. This is similar to the determining steps described above with respect to decision diamonds 235, 256. Thus, for a "stretched" fiber span case (e.g., where the span extends beyond the reach of the OSC signal, or "yes" to blocks 235, 256), the processes may further include various steps for optimization without the need to shut down, which may introduce more issues. If it is not a stretched fiber span (i.e., "no" to blocks 235, 256), the process may include a full calibration process. The main concern in this case is that the Raman pumps may be turned on automatically.

According to some embodiments, the processes described herein may be referred to as a "zero touch bootstrapping" process for performing a power-up process without user intervention in the context of a stretched fiber span. Therefore, the aspects of the present disclosure may be defined in some embodiments as solving a specific problem of getting communications up for zero touch when the OSC signal needs to be amplified. Zero Touch Provisioning (ZTP) can come in a secondary plane when needed.

Adjusting the power level or gain level of the Raman pumps can be done in a gradual manner, which can be referred to as secondary optimizations. In conventional systems, Raman amplifiers and OSC transceivers are typically not build onto the same card. However, in the present disclosure, they can be placed on the same card. A network operator may apply OSC signaling when the Raman amplifier is on. In this respect, the OSC signaling may benefit from the Raman amplification to extend the reach. Therefore, it is possible to have direct OSC communication from one node to another, even for a stretched fiber span. When necessary, further optimization can be executed.

The Erbium-Doped Fiber Amplifiers (EDFAs) are typically configured on a discrete module, where inside that module there is a long spool of fiber. It is pumped with laser light with a high level of gain to account for the normally high attenuation or loss (e.g., about 20-25 dB every 80 km). The Raman amplifier experiences the same attenuation, but normally uses the fiber in the ground as an amplifier. A Raman pump can shoot backwards (i.e., counter to the propagation of data signals) inside the fiber plant in the ground. However, the Raman amplifier is able to make the amplification distributed over the life of the fiber. Thus, the signals trail off as they propagate farther away from the pumps and will usually experience more attenuation near the end.

One problem with Raman amplifiers is that the laser is pumped into the fiber at a very high power. If there is a problem, it is possible that the Raman amplifier could cause a fire or damage an installer's eyes. For this reason, it is beneficial to provide remote Raman turn-up.

Integrated Line Amplifiers (ILAs) are standard types of amplifiers. With Raman, they pump over the lines to the previous site. However, there may not be communication with that site, so that communication will be blind.

The term "truck roll" refers an installer driving to the site or sending personnel physically to a specific site location. Again, after the physical installation, however, the systems and methods of the present disclosure allow the installer to leave the site, at which point the installer, network administrator, or other optical network expert can run the automated turn-up process to get the Raman amplifier configured for operation without the installer being present. Instead, the automatic turn-up can be done remotely. In this sense, local people can plug everything in and then a more-knowledgeable expert can do everything else remotely. The remote process therefore requires a smaller time commitment from the expert, since he or she does not need to do everything on site.

An advantage of the systems and methods of the present disclosure includes considering the Raman gain benefit for OSC signals and taking advantage of that for extending OSC reach for stretched fiber spans. By extending the reach, automatic remote node configuration and system turn-up and calibration process can be achieved. The present processes can keep the non-linear concerns (e.g., FWM, Rayleigh Scattering, etc.) into account, instead of allowing a blind turn-up of all Raman pumps.

The remote automatic turn-up process overcome deficiencies of prior systems that currently do not work for stretched fiber spans (e.g., greater than the OSC reach). The present embodiments are aimed to introducing this functionality, whereby the remote turn-up process will work for a majority of the stretched fiber spans in the network.

One key issue to turn-up Raman automatically is to figure out the safe power limit of the Raman amplifier to launch it to a fiber span. It may be possible, in some applications, that an OTDR signal may not be available to the Raman card, which means that the Raman controller does not have any visibility of any point losses present in the fiber span. Since the power of the Raman is blindly launched into the span without knowing the actual fiber conditions, if the point losses are close to the faceplate, there is a possibility that the fiber plant can get damaged with high pump power. To limit the damage exposure to the fiber plant, the processes of the present disclosure may further include the step of keeping the launch power below a power limit that will not damage a fiber plant even it has a typical high pinch or point loss. Such power limit, for example, can be the same as a typical EDFA power output (e.g., 23 dBm) or below laser 1M limit (e.g., 21.5 dBm). Also, for such condition where an objective is to amplify the OSC signal, not all of the pumps on the Raman amplifier need to be turned on. Algorithms can be applied to select a specific pump or a specific group of pumps to be turned on at initial turn-up to provide the maximum possible OSC gain.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising
a processing device, and
a memory device configured to store a computer program having instructions that, when executed, cause the processing device to
turn on one or more Raman pumps of a Raman amplifier to a predetermined safe gain or power level,
determine an estimated loss along a fiber optic span of a link between adjacent nodes of an optical network, and
responsive to the estimated loss being greater than a reach of an Optical Supervisory Channel (OSC) signal along the link, automatically adjust the gain or power level of the one or more Raman pumps until the OSC signal is enabled.

2. The system of claim 1, wherein the predetermined safe gain or power level is set to a level for avoiding pump overlaps between a C-band and an L-band and for avoiding damage to the fiber optic span.

3. The system of claim 1, wherein the estimated loss is carried by telemetry signals propagating on a different frequency than the OSC signal.

4. The system of claim 1, wherein the OSC signal and a set of commissioning instructions are established at a remote node and communicated to a local node to commission the local node.

5. The system of claim 1, wherein, responsive to the estimated loss being less than the reach of the OSC signal, the instructions further cause the processing device to perform a gain-scanning process to find a range between minimum gain and maximum gain.

6. The system of claim 5, wherein the instructions further cause the processing device to adjust the gain or power level of the one or more Raman pumps.

7. The system of claim 1, wherein the instructions further cause the processing device to
determine if a fault on the link has cleared,
run an Optical Time Domain Reflectometry (OTDR) trace on the link, and
turn on the one or more Raman pumps when the OTDR trace returns an acceptable point loss and back reflection to determine a "go" status.

8. The system of claim 1, wherein the instructions further cause the processing device to turn on the one or more Raman pumps to the predetermined safe gain or power level without knowing results of any Optical Time Domain Reflectometry (OTDR) traces and without knowing the reach of the OSC signal.

9. The system of claim 1, wherein the instructions further cause the processing device to turn on the one or more Raman pumps to the predetermined safe gain or power level by taking into consideration the reach of the OSC signal to optimize the power of the one or more Raman pumps.

10. The system of claim 1, wherein turning on the one or more Raman pumps is performed automatically without any user intervention or without any interactions with an external processing unit, shelf or node level processor, or Software Defined Networking (SDN) controller.

11. A non-transitory computer-readable medium configured to store computer logic having instructions that, when executed, cause one or more processing devices to
turn on one or more Raman pumps of a Raman amplifier to a predetermined safe gain or power level,
determine an estimated loss along a fiber optic span of a link between adjacent nodes of an optical network, and
responsive to the estimated loss being greater than a reach of an Optical Supervisory Channel (OSC) signal along the link, automatically adjust the gain or power level of the one or more Raman pumps until the OSC signal is enabled.

12. The non-transitory computer-readable medium of claim 11, wherein, responsive to the estimated loss being less than the reach of the OSC signal, the instructions further cause the one or more processing devices to perform a gain-scanning process to find a range between minimum gain and maximum gain and to adjust the gain or power level of the one or more Raman pumps.

13. A method comprising the steps of
turning on one or more Raman pumps of a Raman amplifier to a predetermined safe gain or power level,
determining an estimated loss along a fiber optic span of a link between adjacent nodes of an optical network, and
responsive to the estimated loss being greater than a reach of an Optical Supervisory Channel (OSC) signal along the link, automatically adjusting the gain or power level of the one or more Raman pumps until the OSC signal is enabled.

14. The method of claim 13, wherein the predetermined safe gain or power level is set to a level for avoiding pump overlaps between a C-band and an L-band and for avoiding damage to the fiber optic span.

15. The method of claim 13, further comprising the steps of
determining if a fault on the link has cleared,
running an Optical Time Domain Reflectometry (OTDR) trace on the link, and turning on the one or more Raman pumps when the OTDR trace returns an acceptable point loss and back reflection to determine a "go" status.

16. The method of claim 13, wherein the estimated loss is carried by telemetry signals propagating on a different frequency than the OSC signal.

17. The method of claim 13, wherein, responsive to the estimated loss being greater than the reach of the OSC signal, leaving the one or more Raman pumps on until forced off.

18. The method of claim 13, further comprising the steps of
accessing an OSC receiver power and Loss of Frame (LOF) condition,
responsive to the OSC signal being in the LOF, turning the one or more Raman pumps on,
monitoring an OSC Raman gain and the LOF condition, and
responsive to a maximum LOF being greater than the OSC Raman gain, freezing the one or more Raman pumps.

19. The method of claim 18, wherein, responsive to the maximum LOF being less than the OSC Raman gain, increasing a power level of the one or more Raman pumps in a gradual step.

20. The method of claim 13, wherein the step of turning on the one or more Raman pumps is performed automatically without any user intervention or without any interactions with an external processing unit, shelf or node processor, or Software-Defined Networking (SDN) controller.

* * * * *